US012619765B2

(12) United States Patent
Alaeddini

(10) Patent No.: US 12,619,765 B2
(45) Date of Patent: May 5, 2026

(54) EXISTING POLICY DETERMINATIONS FOR AN IDENTITY SET

(71) Applicant: Amazon Technologies, Inc., Seattle, WA (US)

(72) Inventor: Atiye Alaeddini, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 17/708,341

(22) Filed: Mar. 30, 2022

(65) Prior Publication Data

US 2023/0315898 A1 Oct. 5, 2023

(51) Int. Cl.
| | |
|---|---|
| *G06F 21/30* | (2013.01) |
| *G06F 21/60* | (2013.01) |
| *G06F 21/62* | (2013.01) |

(52) U.S. Cl.
CPC .......... *G06F 21/6245* (2013.01); *G06F 21/30* (2013.01); *G06F 21/604* (2013.01); *G06F 2221/2141* (2013.01)

(58) Field of Classification Search
CPC .... G06F 21/6245; G06F 21/30; G06F 21/604; G06F 2221/2141; H04L 63/104; H06L 63/105
USPC .......................................................... 726/1
See application file for complete search history.

(56) References Cited

U.S. PATENT DOCUMENTS

| | | | |
|---|---|---|---|
| 10,122,757 B1 | 11/2018 | Kruse et al. | |
| 10,581,919 B2 | 3/2020 | Kruse et al. | |
| 10,778,691 B1 * | 9/2020 | Kissell | H04L 63/104 |
| 2003/0088786 A1 * | 5/2003 | Moran | H04L 63/102 |
| | | | 726/4 |

(Continued)

FOREIGN PATENT DOCUMENTS

| | | | | |
|---|---|---|---|---|
| EP | 2631841 B1 * | 11/2015 | ............. | G06F 21/00 |
| KR | 20230146534 A * | 10/2023 | ........... | G06F 21/604 |

OTHER PUBLICATIONS

Kumar, R., Sural, S., Gupta, A. (2010). Mining RBAC Roles under Cardinality Constraint. In: Jha, S., Mathuria, A. (eds) Information Systems Security. ICISS 2010. Lecture Notes in Computer Science, vol. 6503. Springer, Berlin, Heidelberg. https://doi.org/10.1007/978-3-642-17714-9_13 (Year: 2010).*

(Continued)

*Primary Examiner* — Nasser M Goodarzi
(74) *Attorney, Agent, or Firm* — BakerHostetler

(57) ABSTRACT

A plurality of identities may be added to a new policy identity pool associated with new policy generation. Each identity of the plurality of identities may have respective selected permissions associated with permission usage by the identity. A new policy may be generated, based on a set of new policy constraints, that corresponds to a largest group of identities within the new policy identity pool for which the set of new policy constraints is satisfied. The set of new policy constraints may include a first constraint that the new policy includes the respective selected permissions for each identity within the largest group of identities and a second (Continued)

constraint that the new policy does not exceed one or more maximum additional permission thresholds. One or more indications may be provided, to a user, to attach the new policy to each identity within the largest group of identities.

20 Claims, 23 Drawing Sheets

(56) References Cited

U.S. PATENT DOCUMENTS

| | | | |
|---|---|---|---|
| 2005/0138420 A1* | 6/2005 | Sampathkumar | G06F 21/604 726/4 |
| 2008/0109897 A1* | 5/2008 | Moran | H04L 63/105 726/19 |
| 2014/0215604 A1 | 7/2014 | Giblin et al. | |
| 2019/0081954 A1* | 3/2019 | Xu | H04L 63/108 |
| 2020/0356682 A1* | 11/2020 | Gu | G06F 21/6218 |
| 2021/0075794 A1* | 3/2021 | Gazit | H04L 63/1408 |
| 2021/0203687 A1 | 7/2021 | Rabin et al. | |
| 2022/0385668 A1* | 12/2022 | Simonetti | H04L 63/102 |
| 2023/0216887 A1* | 7/2023 | Strong | H04L 63/20 726/4 |

OTHER PUBLICATIONS

"IAM Access Analyzer policy generation"; <https://docs.aws.amazon.com/IAM/latest/UserGuide/access-analyzer-policy-generation.html> webpage with Jan. 29, 2022 capture date, retrieved from Internet Archive Wayback Machine <https://web.archive.org/web/20220129144913/https://docs.aws.amazon.com/IAM/latest/UserGuide/access-analyzer-policy-generation.html> on Feb. 9, 2024, 17 pages.
Chandra Chekuri; CS 598CSC: Approximation Algorithms; Lecture; Jan. 2011; 7 pages.
https://www.cs.cmu.edu/~avrim/451f12/lectures/lect1106.pdf; Lecture 21—Approximation Algorithms, Nov. 2012; p. 91-95.
Land et al.; "An Automatic Method of Solving Discrete Programming Problems"; Econometrica; vol. 28 No. 3; Jul. 1960; p. 497-520.
Padberg et al; "A Branch-and-Cut Algorithm for the Resolution of Large-Scale Symmetric Traveling Salesman Problems"; SIAM Review; vol. 33(1); Mar. 1991; p. 60-100.
Savelsberg; "A Branch-and-Price Algorithm for the Generalized Assignment Problem"; Operations Research; vol. 45 No. 6; 1997; 23 pages.
"Reviewing and applying recommendations"; https://cloud.google.com/iam/docs/recommender-managing; Oct. 2020; accessed Oct. 21, 2020; 5 pages.
"Enforce least privilege with recommendations"; https://cloud.google.com/iam/docs/recommender-overview; Oct. 2020; accessed Oct. 20, 2020; 13 pages.
Wang et al.; "Exploring the machine learning models behind Cloud IAM Recommender"; https://cloud.google.com/blog/products/identity-security/exploring-the-machine-learning-models-behind-cloud-iam-recommender; Google; Nov. 2019; accessed Aug. 29, 2022; 4 pages.
Mesquita et al.; "Set partitioning/covering-based approaches for the integrated vehicle and crew scheduling problem"; Computers & Operations Research; vol. 35; May 2008; p. 1562-1575.
International Patent Application No. PCT/US2023/065105; Int'l Search Report and the Written Opinion; dated Jul. 14, 2023; 18 pages.
Kumar et al.; "Mining RBAC Roles under Cardinality Constraint"; 18th Int'l Conf. on Information Systems Security; 2010; p. 171-185.
Mitra et al.; "A Survey of Role Mining"; ACM Computing Surveys; vol. 48 No. 4; Feb. 2016; 37 pages.
International Patent Application No. PCT/US2023/065105; Int'l Preliminary Report on Patentability; dated Oct. 10, 2024; 11 pages.

\* cited by examiner

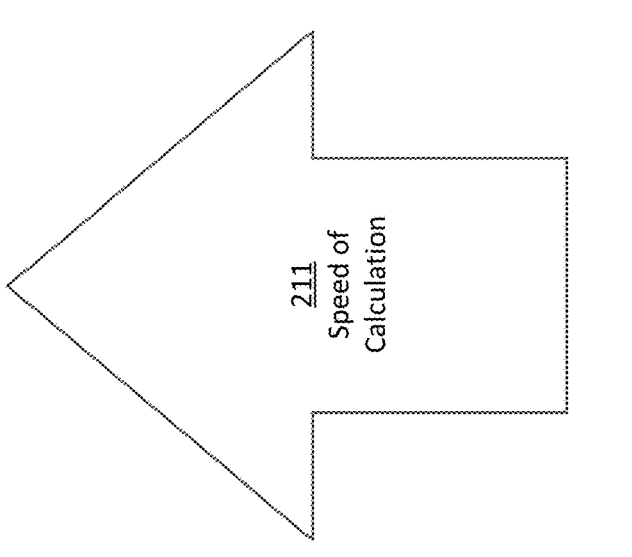
212
Granularity
Permission Matching Granularities 200
Service-Level Granularity 201
Action Category-Level Granularity 202
Individual Action-Level Granularity 203
211
Speed of
Calculation
FIG. 2

$$U = \{s_1, s_2, ..., s_n\}$$

$$P = \{p_1, p_2, \cdots, p_m\}, \text{ where } p_i \subseteq U$$

$$\bar{U} \subseteq U$$

420

$$\min_{x_i} \sum_{i=1}^{m} x_i \qquad \underline{401}$$

$$\text{s.t.} \quad \sum_{i=1}^{m} x_i \leq M, \qquad \underline{402}$$

$$\sum_{i=1}^{m} x_i \mathbb{1}\{s \in p_i\} \geq 1, \quad \forall s \in \bar{U} \qquad \underline{403}$$

$$\sum_{i=1}^{m} x_i \mathbb{1}\{s \in p_i\} \leq \xi, \quad \forall s \in (U \setminus \bar{U}) \qquad \underline{404}$$

$$x_i \in \{0, 1\}, \qquad \underline{405}$$

$$\bar{U} \subseteq U$$

520

$$\min_{x_i} \sum_{i=1}^{m} x_i \qquad 501$$

$$\text{s.t.} \quad \sum_{i=1}^{m} x_i \leq M, \qquad 502$$

$$\sum_{i=1}^{m} x_i \mathbb{1}\{(s_j : a_k) \in p_i\} \geq 1, \quad \forall (s_j : a_k) \in \bar{U} \qquad 503$$

$$\sum_{i=1}^{m} x_i \mathbb{1}\{(s_j : a_k) \in p_i\} \leq \xi, \quad \forall (s_j : a_k) \in (U \setminus \bar{U}) \qquad 504$$

$$x_i \in \{0, 1\}, \qquad 505$$

$$\bar{U} \subseteq U$$

620

$$\min_{x_i} \sum_{i=1}^{m} x_i \qquad 601$$

$$\text{s.t.} \quad \sum_{i=1}^{m} x_i \leq M, \qquad 602$$

$$\sum_{i=1}^{m} x_i \mathbf{1}\{(s_j : c_k) \in p_i\} \geq 1, \quad \forall (s_j : c_k) \in \bar{U} \qquad 603$$

$$\sum_{i=1}^{m} x_i \mathbf{1}\{(s_j : c_k) \in p_i\} \leq \xi, \quad \forall (s_j : c_k) \in (U \setminus \bar{U}) \qquad 604$$

$$x_i \in \{0, 1\}, \qquad 605$$

Figure 7:
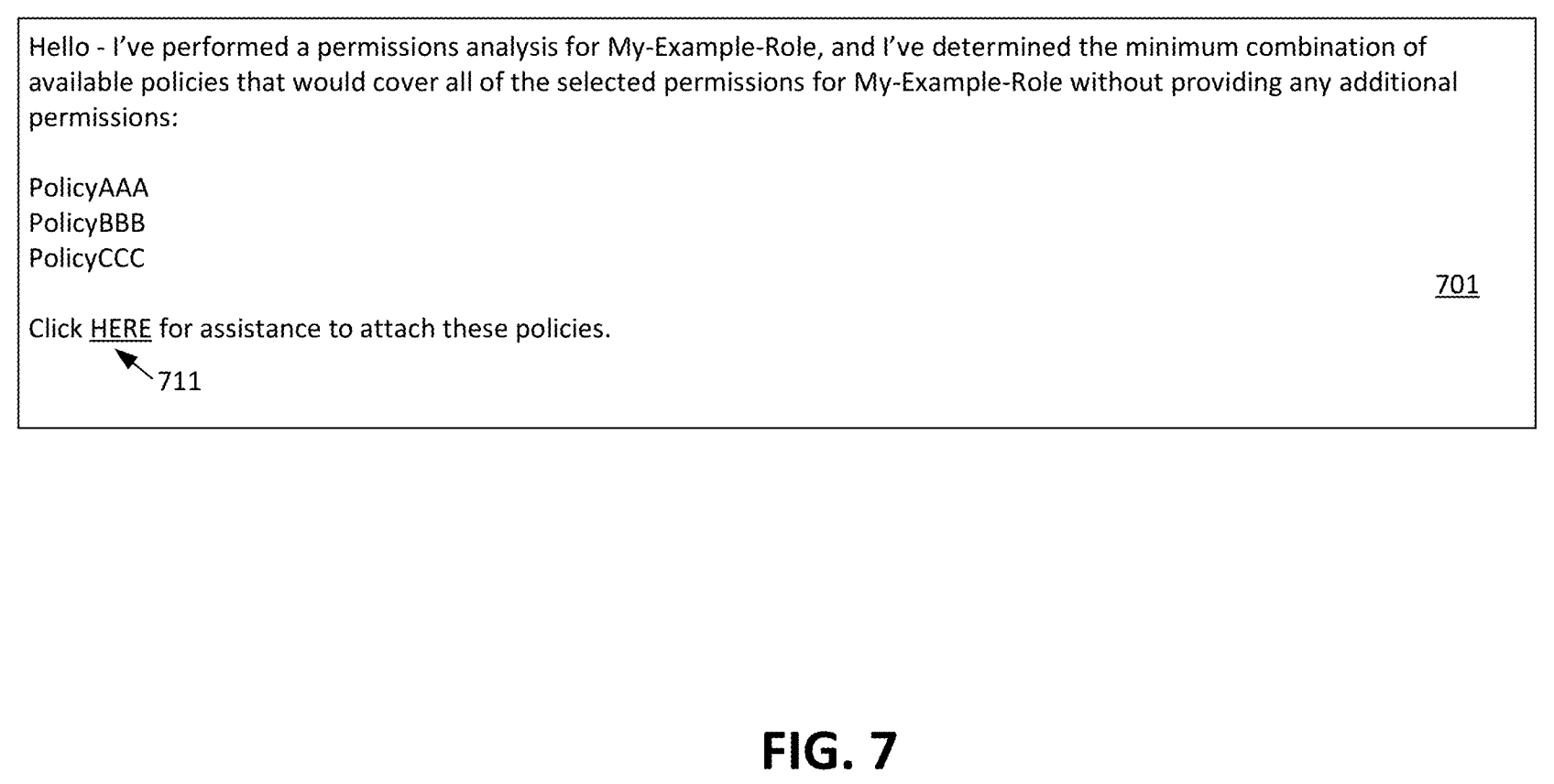

Hello - I've performed a permissions analysis for My-Example-Role, and I've determined the minimum combination of available policies that would cover all of the selected permissions for My-Example-Role without providing any additional permissions:

PolicyAAA
PolicyBBB
PolicyCCC

Click HERE for assistance to attach these policies.

Figure 8:
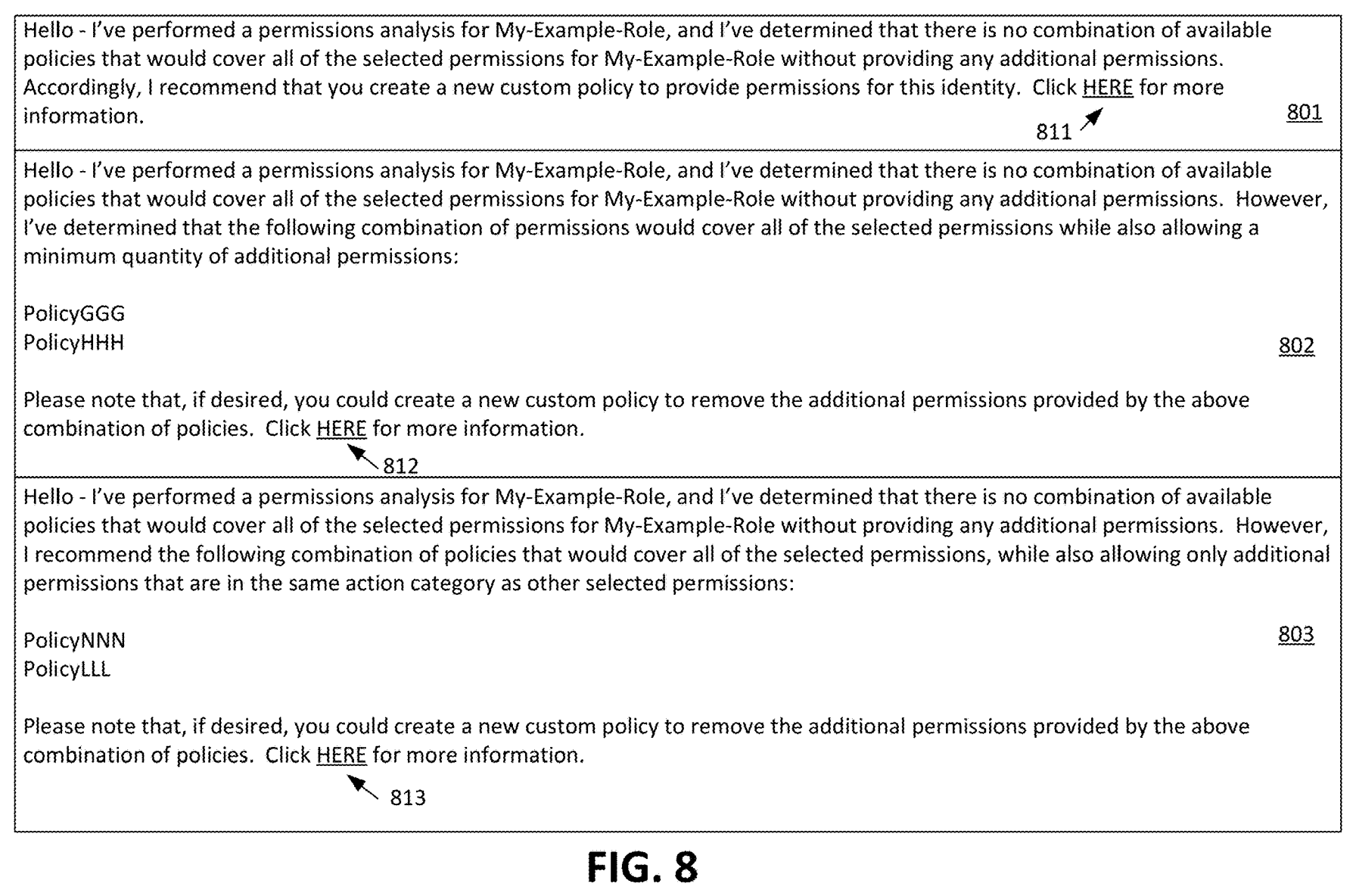

Hello - I've performed a permissions analysis for My-Example-Role, and I've determined that there is no combination of available policies that would cover all of the selected permissions for My-Example-Role without providing any additional permissions. Accordingly, I recommend that you create a new custom policy to provide permissions for this identity. Click HERE for more information.

811

802

Hello - I've performed a permissions analysis for My-Example-Role, and I've determined that there is no combination of available policies that would cover all of the selected permissions for My-Example-Role without providing any additional permissions. However, I've determined that the following combination of permissions would cover all of the selected permissions while also allowing a minimum quantity of additional permissions:

PolicyGGG
PolicyHHH

Please note that, if desired, you could create a new custom policy to remove the additional permissions provided by the above combination of policies. Click HERE for more information.

812

803

Hello - I've performed a permissions analysis for My-Example-Role, and I've determined that there is no combination of available policies that would cover all of the selected permissions for My-Example-Role without providing any additional permissions. However, I recommend the following combination of policies that would cover all of the selected permissions, while also allowing only additional permissions that are in the same action category as other selected permissions:

PolicyNNN
PolicyLLL

Please note that, if desired, you could create a new custom policy to remove the additional permissions provided by the above combination of policies. Click HERE for more information.

Figure 9:
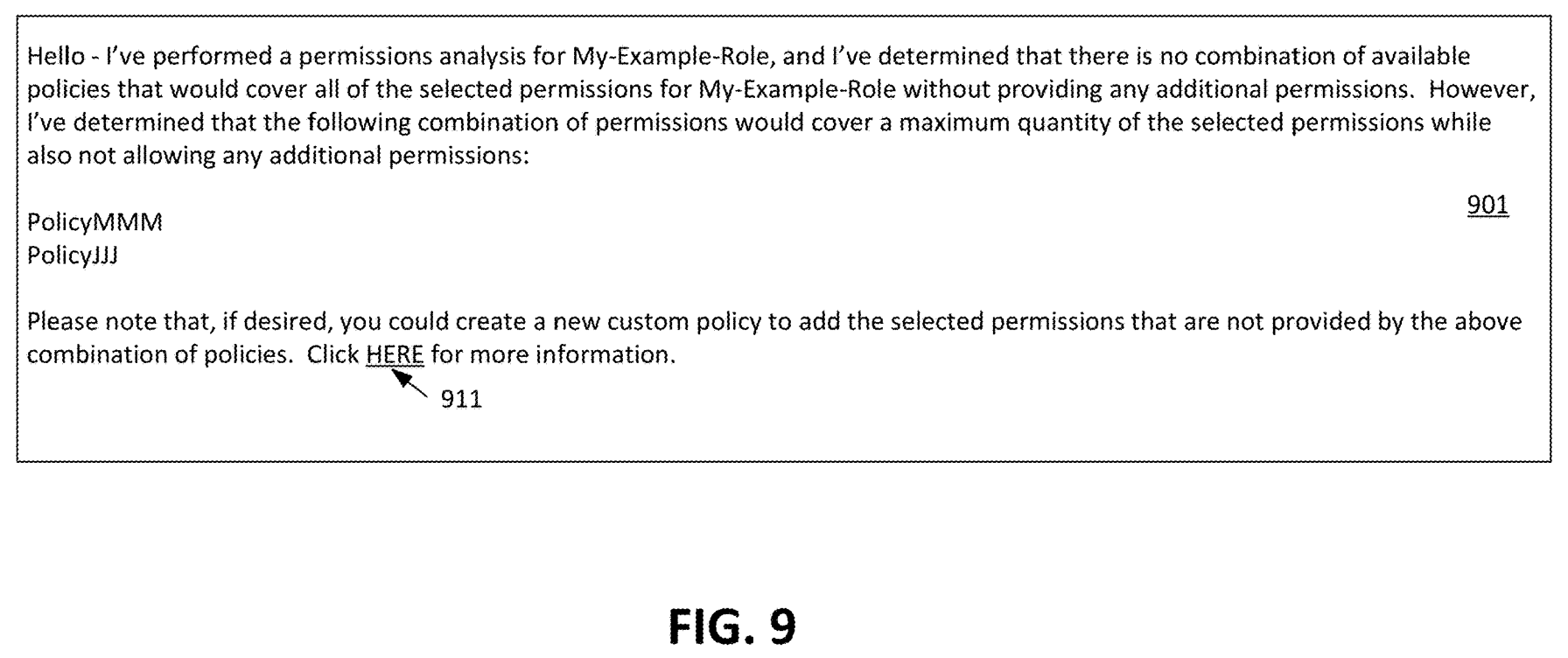

Hello - I've performed a permissions analysis for My-Example-Role, and I've determined that there is no combination of available policies that would cover all of the selected permissions for My-Example-Role without providing any additional permissions. However, I've determined that the following combination of permissions would cover a maximum quantity of the selected permissions while also not allowing any additional permissions:

901

PolicyMMM
PolicyJJJ

Please note that, if desired, you could create a new custom policy to add the selected permissions that are not provided by the above combination of policies. Click HERE for more information.

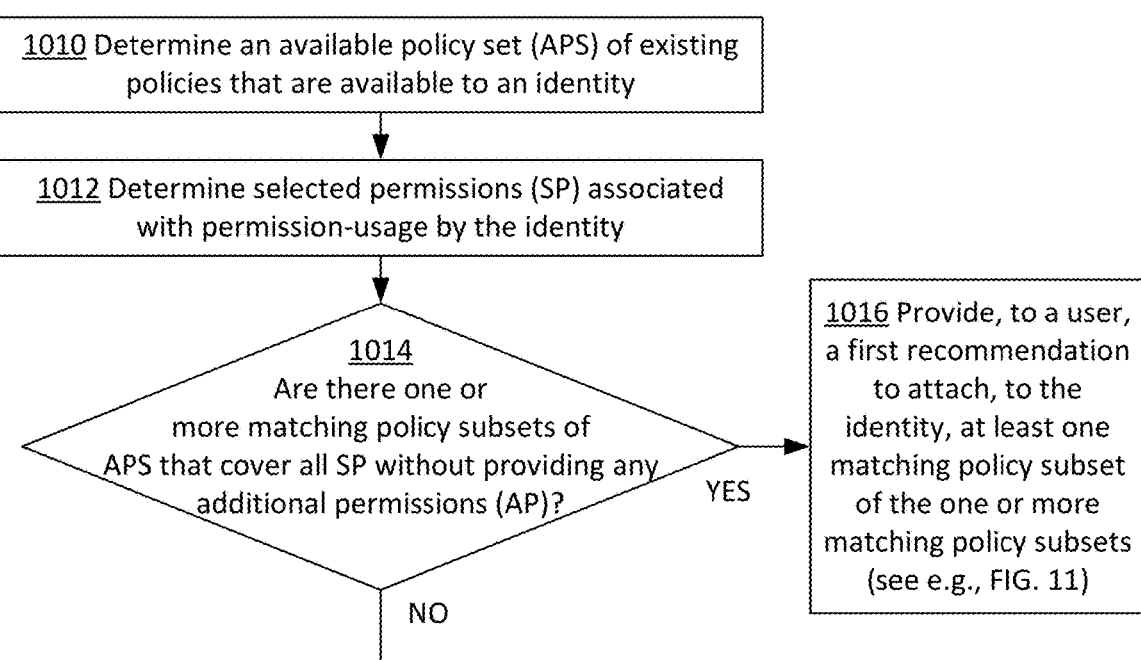

1010 Determine an available policy set (APS) of existing policies that are available to an identity 1012 Determine selected permissions (SP) associated with permission-usage by the identity 1014 Are there one or more matching policy subsets of APS that cover all SP without providing any additional permissions (AP)?

YES

1016 Provide, to a user, a first recommendation to attach, to the identity, at least one matching policy subset of the one or more matching policy subsets (see e.g., FIG. 11)

NO

1018 Provide, to the user, a second recommendation to, attach to the identity, one or more alternative policies 1018A Recommend that the customer create a new policy to attach to the identity 1018B Recommend, based on selected, criteria an alternative subset of APS to attach the identity 1018C Recommend an alternative subset of APS to attach to the identity and also recommend that the customer create a new policy (e.g., as a gap filler) to attach to the identity

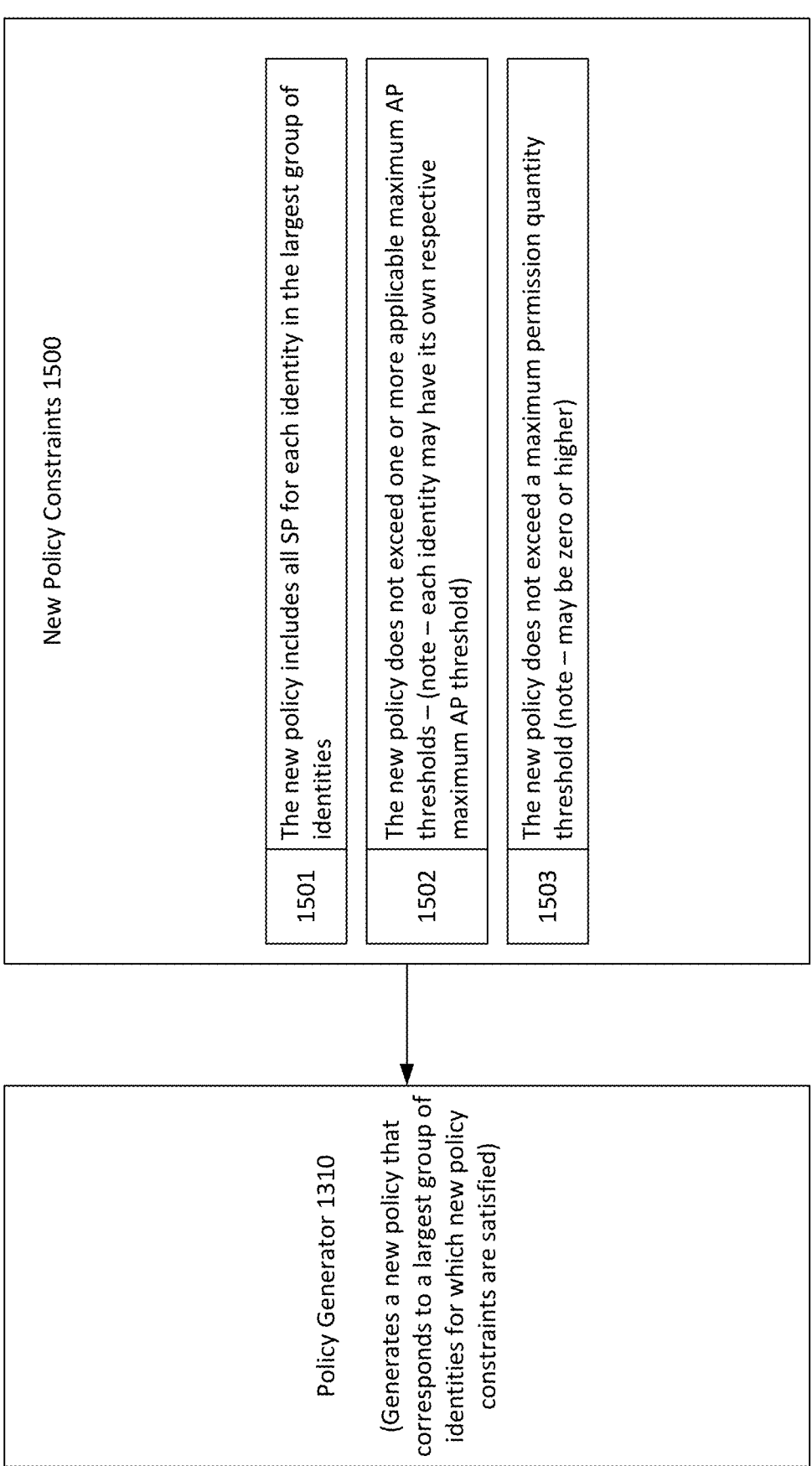

New Policy Constraints 1500

1501 | The new policy includes all SP for each identity in the largest group of identities 1502 | The new policy does not exceed one or more applicable maximum AP thresholds – (note – each identity may have its own respective maximum AP threshold)

1503 | The new policy does not exceed a maximum permission quantity threshold (note – may be zero or higher)

Policy Generator 1310

(Generates a new policy that corresponds to a largest group of identities for which new policy constraints are satisfied)

FIG. 15

$$\text{vector } u_i \in \{0,1\}^N, i = 1, \ldots, K$$

1601

$$\text{vector } \pi \in \{0,1\}^N$$

1602

$$p_j, j \in \{1, 2, \ldots, N\}$$

1603

$$UP_i = \sum_{j=1}^{N} (\pi_{ij} - U_{ij}) = 1^T (\pi - u_i)$$

1604

$$\zeta_{ij} = \begin{cases} 1, & \text{if } U_{ij} \leq \pi_j, \ \forall j \\ 0, & \text{otherwise.} \end{cases}$$

1631
$$\max_{\pi \in \{0,1\}^N, \zeta \in \{0,1\}^K} \sum_{i=1}^{K} \zeta_i$$

s.t.

1632
$$\sum_{j=1}^{N} \pi_j \leq \Xi_i$$

1633
$$\pi_j - U_{ij} - \zeta_i + 1 > 0, \ \forall i,j, \ 1 \leq i \leq K, 1 \leq j \leq N$$

1634
$$\sum_{j=1}^{N} (\pi_j - U_{ij}) + (\Xi - \Xi)(\zeta_i - \delta_i) \leq 0, \ \forall i, \ 1 \leq i \leq K.$$

1640
$$\sum_{j=1}^{N} (\pi_j - U_{ij}) \leq \delta_i$$

1651
$$\sum_{i=1}^{K} \zeta_i$$

1652
$$\sum_{i=1}^{K} w_i \zeta_i$$

FIG. 16B

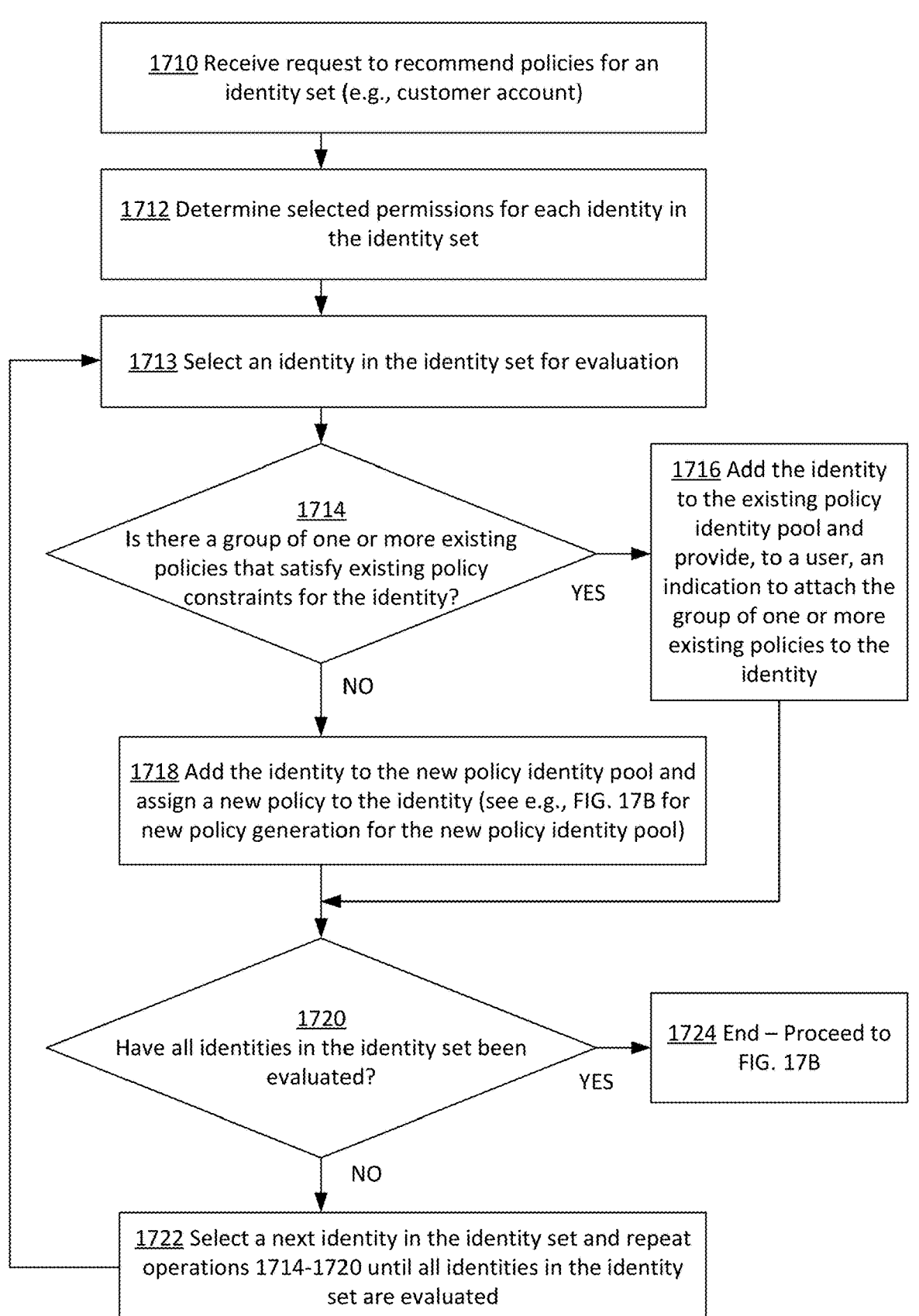

1710 Receive request to recommend policies for an identity set (e.g., customer account)

1712 Determine selected permissions for each identity in the identity set

1713 Select an identity in the identity set for evaluation

1714 Is there a group of one or more existing policies that satisfy existing policy constraints for the identity?

YES

1716 Add the identity to the existing policy identity pool and provide, to a user, an indication to attach the group of one or more existing policies to the identity

NO

1718 Add the identity to the new policy identity pool and assign a new policy to the identity (see e.g., FIG. 17B for new policy generation for the new policy identity pool)

1720 Have all identities in the identity set been evaluated?

YES

1724 End – Proceed to FIG. 17B

NO

1722 Select a next identity in the identity set and repeat operations 1714-1720 until all identities in the identity set are evaluated

EXISTING POLICY DETERMINATIONS FOR AN IDENTITY SET

BACKGROUND

Identity management services may allow customers to control and manage access to computing services and resources by creating identities (e.g., users, groups, roles, etc.) and defining permissions for the identities. When attempting to attach policies to an identity, customers may have the options of attaching one or more existing policies and/or creating one or more new policies that are specially tailored to the identity. But creation of new policies from scratch for every identity may require considerable time and effort and may be prone to errors. Some customers that don't wish to invest this considerable time and energy may prefer to use existing policies. However, since customers do not necessarily know the names of relevant policies that fit their required set of permissions, the customers may attach overly broad policies, which may pose a security risk. Customers may also be unsure of which identities could use existing policies and which identities require the creation of new policies. For example, in some cases, customers may resort to creating a new policy even when there are existing policies that may fit their required set of permissions, which may involve unnecessary expenditures of time and effort. Additionally, when attempting to create new policies for a group of identities, such as identities within a given account, the customers may perform unnecessary steps. For example, in some cases, a customer may create a separate new policy for each identity, even in scenarios when a single policy could be generated that would cover the security requirements of multiple identities. This is because customers may be unaware of which, if any, identities could be most effectively covered together by a single new policy. Customers may also be unaware of the contents of the policy that would be required in order to cover the security requirements of these multiple identities.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 is a diagram illustrating example permission matching granularities that may be used in accordance with the present disclosure.

FIG. 4 is a diagram illustrating an example matching policy subset calculation formula with service-level granularity that may be used in accordance with the present disclosure.

FIG. 5 is a diagram illustrating an example matching policy subset calculation formula with individual action-level granularity that may be used in accordance with the present disclosure.

FIG. 6 is a diagram illustrating an example matching policy subset calculation formula with action category-level granularity that may be used in accordance with the present disclosure.

FIG. 7 is a diagram illustrating a first example of a policy recommendation user interface that may be used in accordance with the present disclosure.

FIG. 8 is a diagram illustrating second examples of policy recommendation user interfaces that may be used in accordance with the present disclosure.

FIG. 9 is a diagram illustrating a third example of a policy recommendation user interface that may be used in accordance with the present disclosure.

FIG. 10 is a flowchart illustrating an example policy recommendation process that may be used in accordance with the present disclosure.

FIGS. 14A-14C are diagrams illustrating generation of new policies that may be used in accordance with the present disclosure.

FIG. 15 is a diagram illustrating example new policy constraints that may be used in accordance with the present disclosure.

FIGS. 16A-B are diagrams illustrating example definitions and formulas related to new policy generation that may be used in accordance with the present disclosure.

FIG. 17A is a flowchart illustrating an example process for formation of new policy and existing policy identity pools that may be used in accordance with the present disclosure.

DETAILED DESCRIPTION

Figure 1:
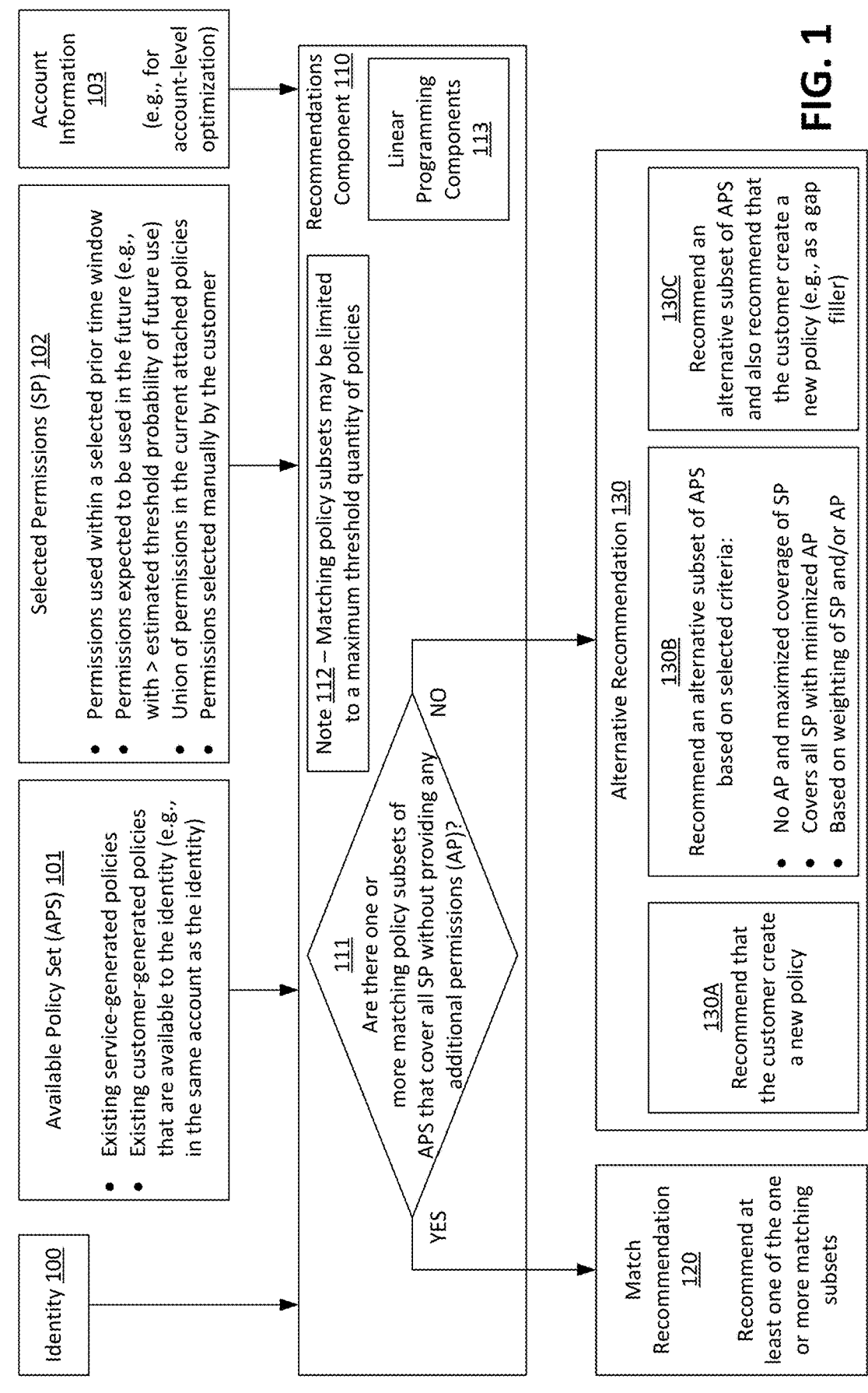
FIG. 1 is a diagram illustrating an example policy recommendation system that may be used in accordance with the present disclosure.

Techniques for identity management recommendations for use of existing policies are described herein. The described techniques may be employed by an identity management service, which may allow customers to control and manage access to computing services and resources by creating identities (e.g., users, groups, roles, etc.) and defining permissions for the identities. In some examples, the identity management service may provide, to a customer, recommendations for existing policies to attach to an identity in order to help meet the security requirements of the identity. To make these recommendations, the identity management service may determine an available policy set, which is a set of existing policies that are available to the identity. The available policy set may include one or more existing service-generated policies that are generated by the identity management service. The available policy set may also include one or more existing customer-generated policies that are available to the identity, such as one or more existing customer-generated policies that are within the same customer account as the identity. The identity management service may also determine selected permissions for the identity, which are permissions associated with permission-usage by the identity. The selected permissions may include, for example, permissions that have been used by the identity within a selected prior time window (e.g., within the past 90 days). The selected permissions may also include, for example, permissions that are estimated to have greater than a threshold probability of being used, by the identity, within a future time period. In some examples, the selected permissions may also include other permissions, such as permissions selected manually by the customer, a union of permissions across multiple policies that are currently attached to the identity (if the identity currently has attached policies), and the like.

Inputs, including the available policy set and the selected permissions, may be provided to a recommendations component, which may provide policy recommendations for the identity to the customer. The recommendations component may then evaluate the inputs to determine whether the available policy set includes one or more matching policy subsets, which are subsets that cover all the selected permissions without allowing any additional permissions. The term additional permissions, as used herein, refers to permissions that are not included in the selected permissions. If the available policy set includes the one or more matching policy subsets, then a recommendation may be provided, to the customer, to use at least one of the matching policy subsets. For example, if the available policy set includes only a single matching policy subset, then that single matching policy subset may be recommended. By contrast, if the available policy set includes multiple matching policy subsets, then one of the multiple matching policy subsets may be selected for recommendation based on various criteria. In some examples, a matching policy subset that includes the fewest number of policies may be recommended. In other examples, the recommended matching policy subset may be selected based at least in part on other criteria, such as action-level data, names of the policies (e.g., to match a name of the identity), and other weighting techniques. In some examples, the matching policy subsets may be limited to a maximum threshold quantity of policies. Thus, in some examples, a policy subset that may otherwise match the identity's security requirements (i.e., that covers all the selected permissions without allowing any additional permissions), but that includes more than the threshold quantity of policies, may not be considered to be a matching policy subset.

If, on the other hand, the available policy set does not include any matching policy subsets, then an alternative recommendation may be provided to the customer. In some examples, the alternative recommendation may be a recommendation for the customer to create a new (i.e., custom) policy for the identity that matches the identity's security requirements. In other examples, the alternative recommendation may be a recommendation for the customer to use an alternative policy subset from the available policy set. The alternative policy subset may be a subset of the available policy set that does not exactly match the identity's security requirements but that provides a close approximation of the identity's security requirements. In yet other examples, the alternative recommendation may be a recommendation for the customer to use an alternative policy subset from the available policy set and also for the customer to create a new (i.e., custom) policy, such as to use as a gap filler for the alternative policy subset. For example, in some cases, the alternative policy subset might cover most of the selected permissions but may fail to cover a small remaining quantity of the selected permissions. In this example, the customer could generate a new policy to cover these remaining selected permissions. Also, in some examples, the alternative policy subset might provide a small quantity of additional permissions that are not included in the selected permissions. In this example, the customer could generate a new policy to exclude these additional permissions from the identity.

In some examples, similar to the matching policy subsets, the alternative policy subsets may also be limited to a threshold quantity of policies. In some examples, an alternative policy subset may be selected based on various criteria. For example, in some cases, an alternative policy subset could be selected that includes no additional permissions while covering a maximum quantity of the selected permissions (i.e., that includes an equal or greater quantity of the selected permissions than any other subset of the available policies that includes no additional permissions). In other examples, an alternative policy subset could be selected that covers all of the selected permissions while including a minimum quantity of additional permissions (i.e., that includes an equal or smaller quantity of the additional permissions than any other subset of the available policies that covers all the selected permissions). Additionally, in some examples, the alternative policy subset may be selected based on weighting of the selected permissions and/or the additional permissions. As an example, in some cases, certain types of additional permissions might be considered to pose a greater security risk than others. For example, write permissions might be considered to pose a greater security risk than read permissions. In these cases, write permissions might be assigned a lower weight than read permissions. This would mean that a policy that granted a write permission (and not a read permission) as an additional permission may be less likely to be recommended than a policy that granted a read permission (and not a write permission) as an additional permission.

In some examples, the recommendations component may be configured to perform the above-describe policy recommendation determinations at any one or more of multiple levels of granularity. In some examples, these multiple levels of granularity may include a service level granularity, an action category-level granularity and an individual action-level granularity. One reason for providing these different granularities is that they allow for flexibility with respect to speed of computation of the policy recommendations. For example, of the three granularities identified above, the service-level granularity may allow for the fastest speed of computation of the policy recommendations but may also be the least granular. By contrast, the individual action-level granularity may be the most granular, but it may also result in slowest speed of computation. The service-level granularity means that, for purposes of matching a policy's permission to a selected permission, all types of permissions for a given service are considered to match one another. For example, consider a scenario in which one of the selected permissions is SeviceX-GetObject and a given policy (Policy P) provides only a ServiceX-PutObject permission. In this example, with service-level granularity, Policy P would be considered to cover the SeviceX-GetObject permission, even though GetObject is a different action than PutObject. The individual action-level granularity means that, for purposes of matching a policy's permission to a selected permission, only permissions for identical services and identical actions are considered to match one another. For example, with the individual action-level granularity, Policy P would not be considered to cover the SeviceX-GetObject permission, because PutObject is a different action than GetObject.

The action category-level granularity is a third level of granularity in which actions may be grouped into a plurality of categories. The action category-level of granularity means that, for purposes of matching a policy's permission to a selected permission, permissions for identical services that are within the same category of actions are considered to match one another. In some examples, the action category-level granularity may be advantageous because it may allow faster computation than the individual action-level granularity while also offering more granular recommendations than the service-level granularity. In one specific example, at least five categories of actions may be created, which include a list category, a read category, a write category, a permissions management category and a tagging category. Any number of custom user-defined action categories may also be created. In some cases, permissions such as Read, GetObject and GetBucketLocation may be included in the read category (as they relate to read operations), while permissions such as Write, CreateBucket, DeleteBucket and PutObject may be included in the write category (as they relate to write operations). For example, with the action category-level granularity, Policy P may not be considered to cover the SeviceX-GetObject permission, because PutObject may be in an action category (i.e., the write category) that is different from the category of GetObject (i.e., the read category). However, with the action category-level granularity, Policy P may be considered to cover the SeviceX-CreateBucket permission, because PutObject and CreateBucket may both be included in the same category (i.e., the write category).

The policy recommendation techniques described herein may provide a number of advantages. For example, these techniques may help to increase, and in some cases maximize, the use of service-generated policies. Additionally, these techniques may assist customers in re-using their own customer-generated policies. This may save customers from the unnecessary investment of time and effort to generate new policies when existing policies that match an identity's security requirements are available. Moreover, these techniques may also dissuade customers from using overly broad existing policies, thereby reducing security risks. Also, these techniques may help to simplify permissions by potentially identifying and recommending a minimum quantity of policies (and in some cases a single policy) that will match an identity's security requirements. Furthermore, these techniques may help customers to identify the scenarios in which no existing policies are available that match an identity's security requirements, which may help customers to better determine when it is advantageous to generate a new custom policy.

FIG. 1 is a diagram illustrating an example policy recommendation system that may be used in accordance with the present disclosure. As shown in FIG. 1, a recommendations component 110 provides policy recommendations for existing policies that may be attached to an identity 100 in order to help meet the security requirements of the identity 100. The recommendations component 110 may be provided by an identity management service that may allow management of the security requirements of identity 100. To assist in making these recommendations, the identity management service may determine an available policy set 101, which is a set of existing policies that are available to the identity 100. The available policy set 101 may include, for example, one or more existing service-generated policies that are generated by the identity management service. The available policy set 101 may also include, for example, one or more existing customer-generated policies that are available to the identity 100, such as one or more existing customer-generated policies that are within a same customer account as the identity 100.

The identity management service may also determine selected permissions 102 for the identity 100. The selected permissions 102 are permissions associated with permission-usage by the identity 100. The selected permissions 102 may include, for example, permissions that have been used by the identity 100 within a selected prior time window (e.g., within the past 90 days). In some examples, the selected permissions 102 may also include other permissions, such as permissions selected manually by the customer, a union of permissions across multiple policies that are currently attached to the identity 100 (if the identity 100 currently has attached policies), and the like. In one specific example, the selected permissions 102 may also include, for example, permissions that are estimated to have greater than a threshold probability of being used, by the identity 100, in a future time period. For example, in some cases, machine learning components that employ a machine learning model may evaluate a given identity's current attached permissions and prior usage of the current attached permissions. In some examples, based at least in part on the current attached permissions and prior usage of the current attached permissions, the machine learning model may be configured to identify permissions that have not been used, by the given identity, within a previous prior time window (e.g., within the past 90 days) but that are nevertheless likely to be used in the future. In order to make these determinations, the machine learning models may attempt to determine patterns, such as patterns of repeat permissions usage by individual identities as well as patterns of permission usage by large groups of identities. For example, if a given identity were to use a particular permission every 150 days, this usage pattern may strongly suggest that the permissions may be used again at the next 150 day interval, even if the permission has not been used within the past 90 days. As another example, a pattern may identify that Service X and Service Y have been frequently used together by a large quantity of identities. Now suppose that a given identity has used Service X several times within the past 90 days but has never used Service Y. In this example, the given identity may be considered to have a high probability of using Service Y in the future (because Service Y is frequently used with Service X) even though the given identity has never used Service Y in the past.

As shown in FIG. 1, inputs, including the available policy set 101 and the selected permissions 102, may be provided to recommendations component 110, which may provide policy recommendations for the identity 100 to the customer. The recommendations component 110 may then evaluate the inputs to make a determination 111 of whether the available policy set 101 includes one or more matching policy subsets, which are subsets that cover all the selected permissions 102 without allowing any additional permissions. The term additional permissions, as used herein, refers to permissions that are not included in the selected permissions 102. The term matching policy subset, as used herein, refers to a subset of available policy set 101 that includes one or more policies that cover all of the selected permissions 102 (as defined based on a selected granularity, such as one of granularities 201-203 described below) without allowing any additional permissions (or, in some cases, without exceeding a threshold acceptable level of additional permissions).

If the available policy set 101 includes one or more matching policy subsets, then the recommendations component 110 may provide, to the customer, a match recommendation 120. The match recommendation 120 is a recommendation for the customer to use at least one of the matching policy subsets. For example, if the available policy set 101 includes only a single matching policy subset, then that single matching policy subset may be recommended. By contrast, if the available policy set 101 includes multiple matching policy subsets, then one of the multiple matching policy subsets may be selected for recommendation based on various criteria. In some examples, a matching policy subset that includes the fewest number of policies may be recommended. In other examples, the recommended matching policy subset may be selected based at least in part on other criteria, such as action-level data, names of the policies (e.g., to match a name of the identity), and other weighting techniques. As indicated in note 112, the matching policy subsets may be limited to a maximum threshold quantity of policies. Thus, in some examples, a policy subset that may otherwise match the identity's security requirements (i.e., that covers all of the selected permissions 102 without allowing any additional permissions), but that includes more than the threshold quantity of policies, may not be considered to be a matching policy subset.

If, on the other hand, the available policy set 101 does not include any matching policy subsets, then the recommendations component 110 may provide, to the customer, an alternative recommendation 130. In some examples, the alternative recommendation 130 may include alternative recommendation 130A, alternative recommendation 130B or alternative recommendation 130C. Specifically, alternative recommendation 130A is a recommendation for the customer to create a new (i.e., custom) policy for the identity 100 that matches the security requirements of identity 100. Alternative recommendation 130B is a recommendation for the customer to use an alternative policy subset from the available policy set 101. The alternative policy subset may be a subset of available policy set 101 that does not exactly match the security requirements of identity 100 but that provides a close approximation of the security requirements of identity 100. Alternative recommendation 130C is a recommendation for the customer to use an alternative policy subset from the available policy set 101 and also for the customer to create a new (i.e., custom) policy, such as to use as a gap filler for the alternative policy subset. For example, in some cases, the alternative policy subset might cover most of the selected permissions 102 but may fail to cover a small remaining quantity of the selected permissions 102. In this example, the customer could generate a new policy to cover these remaining one of the selected permissions 102. Also, in some examples, the alternative policy subset might provide a small quantity of additional permissions that are not included in the selected permissions 102. In this example, the customer could generate a new policy to exclude these additional permissions from the identity 100.

In some examples, similar to the matching policy subsets, the alternative policy subsets may also be limited to a threshold quantity of policies. In some examples, an alternative policy subset may be selected based on various criteria. For example, in some cases, an alternative policy subset could be selected that includes no additional permissions while covering a maximum quantity of the selected permissions 102 (i.e., that includes an equal or greater quantity of the selected permissions 102 than any other subset of the available policy set 101 that includes no additional permissions). In other examples, an alternative policy subset could be selected that covers all of the selected permissions while including a minimum quantity of additional permissions (i.e., that includes an equal or smaller quantity of the additional permissions than any other subset of the available policy set 101 that covers all the selected permissions 102). Additionally, in some examples, the alternative policy subset may be selected based on weighting of the selected permissions 102 and/or the additional permissions. As an example, in some cases, certain types of additional permissions might be considered to pose a greater security risk than others. For example, write permissions might be considered to pose a greater security risk than read permissions. In these cases, write permissions might be assigned a lower weight than read permissions. This would mean that a policy that granted a write permission (and not a read permission) as an additional permission may be less likely to be recommended than a policy that granted a read permission (and not a write permission) as an additional permission.

As shown in FIG. 1, the recommendations component 110 may receive account information 103, which may include information about policies attached to other identities in the same account as identity 100. This information may be used to make an account-level optimization. For example, when creating a new custom policy, the user might choose to include and/or exclude certain permissions in the custom policy in order to make the custom policy more advantageous for use with multiple identities in the same customer account. For example, if there is a given permission that is being used by a large quantity of identities within the account, the customer might choose to include this permission in a custom policy, even when the permission has not yet been used by a given identity for which the custom policy is initially created. In some examples, the recommendations component 110 may use account information 103 to provide suggestions to users regarding these and other optimizations to assist users when defining new custom policies.

The recommendations component 110 may be configured to perform the above-described policy recommendation determinations at any one or more of multiple levels of granularity. Referring now to FIG. 2, some example permission matching granularities that may be employed by recommendations component 110 will now be described in detail. In the example of FIG. 2, these example granularities include a service-level granularity 201, an action category-level granularity 202 and an individual action-level granularity 203 (referred to collectively as permission matching granularities 200). One reason for providing these different permission matching granularities 200 is that they allow for flexibility with respect to speed of computation of the policy recommendations. For example, arrow 211 indicates that the speed of computation increases from bottom to top of the order of the permission matching granularities 200 shown in FIG. 2. This means that, of the three permission matching granularities 200, the individual action-level granularity 203 has the slowest speed of computation, while the service-level granularity 201 has the fastest speed of computation. By contrast, arrow 212 indicates that the granularity of the computation increases from top to bottom of the order of the permission matching granularities 200 shown in FIG. 2. This means that, of the three permission matching granularities 200, the service-level granularity 201 provides for the most granular computation, while the individual action-level granularity 203 provides the least granular computation.

The service-level granularity 201 means that, for purposes of matching a policy's permission to a selected permission 102, all types of permissions for a given service are considered to match one another. For example, consider a scenario in which one of the selected permissions 102 is SeviceX-GetObject and a given policy (Policy P) provides only a ServiceX-PutObject permission. In this example, with service-level granularity, Policy P would be considered to cover the SeviceX-GetObject permission, even though GetObject is a different action than PutObject. The individual action-level granularity 203 means that, for purposes of matching a policy's permission to a selected permission 102, only permissions for identical services and identical actions are considered to match one another. For example, with the individual action-level granularity 203, Policy P would not be considered to cover the SeviceX-GetObject permission, because PutObject is a different action than GetObject.

In the action category-level granularity 202, actions may be grouped into a plurality of categories. The action category-level granularity 202 means that, for purposes of matching a policy's permission to a selected permission 102, permissions for identical services that are within the same category of actions are considered to match one another. In some examples, the action category-level granularity 202 may be advantageous because it may allow faster computation than the individual action-level granularity 203 while also offering more granular recommendations than the service-level granularity 201.

Figure 3:
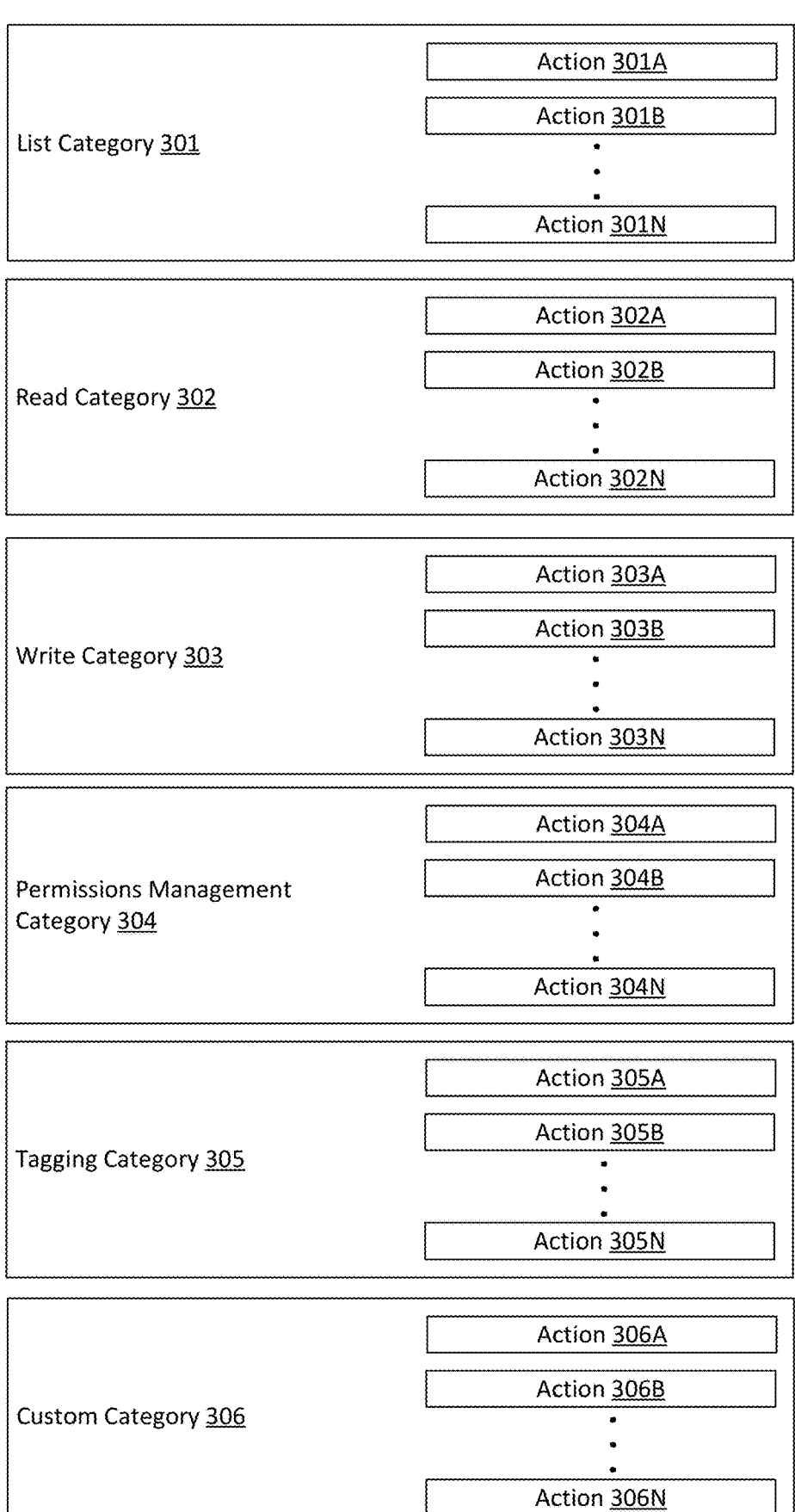
FIG. 3 is a diagram illustrating example action categories that may be used in accordance with the present disclosure.

Referring now to FIG. 3, some example action categories that may be defined for use with action category-level granularity 202 will now be described in detail. In the example of FIG. 3, these example categories include a list category 301, a read category 302, a write category 303, a permissions management category 304, a tagging category 305, and a custom category 306 (referred to collectively as categories 301-306). As shown, list category 301 includes actions 301A-N, read category 302 includes actions 302A-N, write category 303 includes actions 303A-N, permissions management category 304 includes actions 304A-N, tagging category 305 includes actions 305A-N and custom category 306 includes actions 306A-N.

Specifically, list category 301 may include permissions to list resources within a service to determine whether an object exists. Actions with list category 301 may list objects but may not see the contents of a resource. The list category 301 may include actions such as ListBucket. The read category 302 may include permissions to read, but not edit, the contents and attributes of resources in a service. The read category 302 may include actions such as GetObject and GetBucketLocation. The write category 303 may include permissions to create, delete, or modify resources in a service. The write category 303 may also include actions that allow modifying a resource tag. However, an action that allows only changes to tags may be included in tagging category 305. The write category 303 may include actions such as CreateBucket, DeleteBucket and PutObject. The permissions management category 304 may include permissions to grant or modify resource permissions in a service. The permissions management category 304 may include actions such as PutBucketPolicy and DeleteBucketPolicy. The tagging category 305 may include permissions to perform actions that only change a state of resource tags. The tagging category 305 may include actions such as TagRole and UntagRole. However, a CreateRole action (which allows tagging a role resource when that role is created) may be included in write category 303 because the action does not only add a tag. The custom category 306 may be a user-defined category of actions that may include actions that a user (e.g., customer) determines to have characteristics that relate to the category. As a specific example, a customer could create a sensitive category of actions, which may include actions that the customer considers to be sensitive. As another example, a customer could create a non-sensitive category of actions, which may include actions that the customer considers to be non-sensitive. It is appreciated that any number of custom user-defined categories may be created.

Returning to the example described above, with the action category-level granularity 202, Policy P (which provides only a ServiceX-PutObject permission as described above) may not be considered to cover the SeviceX-GetObject permission, because PutObject may be in an action category (i.e., the write category 303) that is different from the category of GetObject (i.e., the read category 302). However, with the action category-level granularity 202, Policy P may be considered to cover the SeviceX-CreateBucket permission, because PutObject and CreateBucket may both be included in the same category (i.e., the write category 303).

In some examples, an identity management service may provide an interface that allows users (e.g., customers) to select, for a given identity and/or account, which of the permission matching granularities 200 should be employed for determination of the permissions recommendations. In some examples, customers may select an option to repeat calculations at multiple different levels of granularity. For example, customers may request that calculations may be made using both the service-level granularity 201 (e.g., to provide initial results more quickly) and the individual action-level granularity 203 (e.g., to provide results at a later time that may be more granular than the service-level results). In some examples, computations at the multiple levels of granularity may be performed at least partially concurrently with one another.

In some examples, any, or all, of the policy recommendations described above may be performed using linear programming techniques. Referring back to FIG. 1, it is shown that recommendations component 110 may include linear programming components 113, which may be employed to assist in making calculations associated with any, or all, of the policy recommendations described above. The recommendations component 110 and/or linear programming components 113 may be executed by one or more computing devices.

Referring now to FIG. 4, an example matching policy subset calculation formula with service-level granularity (referred to hereinafter as service-level formula 400) will now be described in detail. The service-level formula 400 may be employed by recommendations component 110 in order to provide service-level granularity 201. As shown in definitions 420, the letter (U) represents a global pool of services (s), such as all services for which an identity management system manages access. As also shown in definitions 420, the letter uppercase (P) represents available policy set 101, while the letter lowercase (p) represents individual policies within (P). Each individual policy (p) provides access to a respective subset of (U). As also shown in definitions 420, the notation U-overbar represents the selected permissions 102, which, for service-level formula 400, are permissions to access a subset of the global services (i.e., a subset of (U)). In this example, a variable x-subscript-i is defined that has a value of one or zero. The variable x-subscript-i has a value of one if a corresponding policy p-subscript-i is selected for the matching policy subset. Otherwise, the variable x-subscript-i has a value of zero. In service-level formula 400, the letter uppercase (M) represents the maximum quantity of policies that can be included in a matching policy subset. In some examples, the default value of (M) may be set to ten, meaning that no more than ten policies may be included in a matching policy subset. The Greek letter lowercase Xi ($\xi$) represents the maximum quantity of additional permissions that may be provided by the matching policy subset to the given identity. In some examples, the default value of ($\xi$) may be set to zero (meaning the matching policy subset may not provide any additional permissions). However, in other examples, ($\xi$) may be set to a number greater than zero (meaning the matching policy subset may provide up to the specified number of additional permissions).

As shown in service-level formula 400, the term 401 indicates that service-level formula 400 will select a matching policy subset having the minimum subset of policies that satisfy the conditions of service-level formula 400 (i.e., that satisfy constraints 402-405). The abbreviation s.t. in service-level formula 400 (and other formulas described herein) means such that (i.e., such that constraints 402-405 are satisfied). Constraint 402 ensures that the matching policy subset is limited to no more than (M) policies. Constraint 403 ensures that for each service to which the selected permissions 102 grant access, there exists at least one policy in the matching policy subset that grants that service a permission. The upside-down letter A means "for all instances of" in service-level formula 400 (and other formulas described herein). Similarly, constraint 404 prevents the number of additional permissions provided to the given identity, by the matching policy subset, from exceeding the maximum quantity of additional permissions (Xi). Constraint 405 specifies that the variable x-subscript-i has a value of one or zero. As described above, in service-level formula 400, the variable x-subscript-i has a value of one if a corresponding policy p-subscript-i is selected for the matching policy subset. Otherwise, the variable x-subscript-i has a value of zero.

Referring now to FIG. 5, an example matching policy subset calculation formula with individual action-level granularity (referred to hereinafter as individual action-level formula 500) will now be described in detail. The individual action-level formula 500 may be employed by recommendations component 110 in order to provide individual action-level granularity 203. In the example of FIG. 4, the letter (U) represented a global pool of services. However, in the example of FIG. 5, as shown in definitions 520, the letter (U) represents a global pool of services (s) and their associated actions (a). As also shown in definitions 420, the notation U-overbar represents the selected permissions 102, which, for individual action-level formula 500, are permissions to access a subset of the global services and actions (i.e., a subset of (U)). Other variables in FIG. 5 may represent the same features as described above with reference to FIG. 4. As shown in individual action-level formula 500, the term 501 indicates that individual action-level formula 500 will select a matching policy subset having the minimum subset of policies that satisfy the conditions of individual action-level formula 500 (i.e., that satisfy constraints 502-505). Constraint 502 ensures that the matching policy subset is limited to no more than (M) policies. Constraint 503 ensures that for each specific service and individual action combination to which the selected permissions 102 grant access, there exists at least one policy in the matching policy subset that grants that individual action. Similarly, constraint 504 prevents the number of additional permissions, at an individual action-level, provided to the given identity, by the matching policy subset, from exceeding the maximum quantity of additional permissions (Xi). Constraint 505 specifies that the variable x-subscript-i has a value of one or zero. As described above, the variable x-subscript-i has a value of one if a corresponding policy p-subscript-i is selected for the matching policy subset. Otherwise, the variable x-subscript-i has a value of zero.

Referring now to FIG. 6, an example matching policy subset calculation formula with action category-level granularity (referred to hereinafter as action category-level formula 600) will now be described in detail. The action category-level formula 600 may be employed by recommendations component 110 in order to provide action category-level granularity 202. In the example of FIG. 6, as shown in definitions 620, the letter (U) represents a global pool of services (s) and their associated actions categories (c). As also shown in definitions 620, the notation U-overbar represents the selected permissions 102, which, for action category-level formula 600, are permissions to access a subset of the global services and action categories (i.e., a subset of (U)). Other variables in FIG. 6 may represent the same features as described above with reference to FIG. 4. As shown in action category-level formula 600, the term 601 indicates that action category-level formula 600 will select a matching policy subset having the minimum subset of policies that satisfy the conditions of action category-level formula 600 (i.e., that satisfy constraints 602-605). Constraint 602 ensures that the matching policy subset is limited to no more than (M) policies. Constraint 603 ensures that for each specific service and action category combination to which the selected permissions 102 grant access, there exists at least one policy in the matching policy subset that grants that service and action category combination. Similarly, constraint 604 prevents the number of additional permissions, at an action category-level, provided to the given identity, by the matching policy subset, from exceeding the maximum quantity of additional permissions (Xi). Constraint 605 specifies that the variable x-subscript-i has a value of one or zero. It is noted that, while some of the examples described herein relate to linear programming-based calculations, there is no requirement that linear programming must be used. Moreover, in some examples, additional or alternative constraints may be considered in relation to policy recommendation calculations, such as resource-based constraints, tag-based constraints, and others. The inclusions of these and other constraints may potentially change the calculations and strategies that may be employed to make permissions recommendations. Other calculations and strategies may also optionally be employed even in scenarios when no additional or alternative constraints are being considered. Thus, there is no requirement that recommendations component 110 must include linear programming components 113, and there are no requirements that any, or all, of service-level formula 400 of FIG. 4, action-level formula 500 of FIG. 5 and action category-level formula 600 (referred to collectively hereinafter as formulas 400-600) must be employed.

Some examples of policy recommendation user interfaces will now be described in detail with reference to FIGS. 7-9. Referring now to FIG. 7, interface 701 shows an example in which recommendations component 110 is able to determine a minimum combination of existing policies that would cover all of the selected permissions for an example identity (i.e., the My-Example-Role identity) without providing any additional permissions. The interface 701 provides a recommendation to the user to attach this combination of existing policies, which in this example includes three policies (PolicyAAA, PolicyBBB and PolicyCCC). It is noted that, in order to make this determination, the recommendations component 110 may perform one or more linear programming calculations, such as by employing one of formulas 400-600 described above. As also shown in interface 701, link 711 may be selected (e.g., clicked on) by the user for assistance in attaching the recommended policies, such as by navigating the user to a console page that allows attachment of the recommended policies. It is noted that, to make a recommendation to the user, it is not required for an interface to use or display the exact word "recommend" or any other similar word. Rather, a recommendation may include merely informing the user of any combination of one or more policies that can be used to fully, or partially, cover the selected permissions. Moreover, a recommendation may also include suggesting to the user that the user can create a new policy or use a new policy in combination with one or more existing policies.

As also described above, in some examples, there may be no combination of available policies that covers all of the selected permissions without also adding an additional permission. For example, in some cases, this may occur when one or more of formulas 400-600 fail to return any results that meet constraints 402-405, 502-505 and/or 602-605, respectively. Referring now to FIG. 8, interface 801 shows an example of this scenario, in which there is no combination of available policies for My-Example-Role that covers all of the selected permissions without also adding additional permissions. As shown, interface 801 includes a recommendation for the customer to create a new custom policy for My-Example-Role. Interface 801 also includes a link 811, which, upon selection by the user, may provide additional information, such as to inform the user of the selected permissions and to assist in creating the new custom policy (e.g., by navigating to a policy creation page, etc.).

Interface 802 shows another example in which there is no combination of available policies for My-Example-Role that covers all of the selected permissions without also adding additional permissions. However, in the example of interface 802, instead of recommending only that the customer create a new custom policy, a recommendation is made to use an alternative policy subset (i.e., including PolicyGGG and PolicyHHH) that covers all of the selected permissions while including a minimum quantity of additional permissions (i.e., that includes an equal or smaller quantity of the additional permissions than any other subset of the available policies that covers all the selected permissions). Furthermore, interface 802 also informs the user that a new custom policy may be created to remove, from My-Example-Role, the additional permissions that are provided by the recommended combination of policies. Interface 802 includes a link 812, which, upon selection by the user, may provide additional information, such as to inform the user of the additional permissions that are to be removed by the new custom policy and to otherwise assist in creating the new custom policy (e.g., by navigating to a policy creation page, etc.).

Interface 803 shows another example in which there is no combination of available policies for My-Example-Role that covers all of the selected permissions without also adding additional permissions. In the example of interface 803, a recommendation is made to use a different alternative policy subset (i.e., including PolicyNNN and PolicyLLL). As noted in interface 803, this combination of policies covers all of the selected permissions, while also allowing only additional permissions that are in the same action category as other selected permissions. Thus, interface 803 provides an example of a weighting technique that may be employed to make a selection and recommendation of policies. Specifically, in this example, additional permissions that are in a same action category as a selected permission may be weighted higher than additional permissions that are not in a same action category as a selected permission. Thus, based on this weighting technique, a selected combination of policies may be more likely to include additional permissions that are in a same action category as a selected permission than to include additional permissions that are not in a same action category as a selected permission. The reasoning behind this approach is that the security risk in allowing multiple actions within a same action category may be considered lower than the security risk in allowing multiple actions in different categories. For example, if an identity already has the GetObject permission in read category 303 as a selected permission, the risk of allowing the identity to have another additional permission in the read category 302, such as GetBucketLocation, may be considered low. By contrast, if the identity does not currently have any selected permissions in the permissions management category 304, the risk of allow allowing the identity to have an additional permission in the permissions management category 304, such as PutBucketPolicy, may be considered to be higher. It is noted that this is merely one example type of weighting. Other example types of weighting, such as assigning different weights to different action categories (e.g., assigning read permissions a higher weight than write permissions), are described in detail above and are not repeated here.

Interface 803 also informs the user that a new custom policy may be created to remove, from My-Example-Role, the additional permissions that are provided by the recommended combination of policies. Interface 803 includes a link 813, which, upon selection by the user, may provide additional information, such as to inform the user of the additional permissions that are to be removed by the new custom policy and to otherwise assist in creating the new custom policy (e.g., by navigating to a policy creation page, etc.).

Referring now to FIG. 9, interface 901 shows yet another example in which there is no combination of available policies for My-Example-Role that covers all of the selected permissions without also adding additional permissions. In the example of interface 901, a recommendation is made to use an alternative policy subset (i.e., including PolicyMMM and PolicyJJJ) that includes no additional permissions while covering a maximum quantity of the selected permissions (i.e., that includes an equal or greater quantity of the selected permissions than any other subset of the available policies that includes no additional permissions). Furthermore, interface 901 also informs the user that a new custom policy may be created to add, to My-Example-Role, the missing selected permissions that are not provided by the recommended combination of policies. Interface 901 includes a link 911, which, upon selection by the user, may provide additional information, such as to inform the user of the missing selected permissions that are to be added by the new custom policy and to otherwise assist in creating the new custom policy (e.g., by navigating to a policy creation page, etc.).

FIG. 10 is a flowchart illustrating an example policy recommendation process that may be used in accordance with the present disclosure. At operation 1010, an available policy set of existing policies that are available to an identity is determined. The available policy set may include, for example, one or more existing service-generated policies that are generated by the identity management service. The available policy set may also include, for example, one or more existing customer-generated policies that are available to the identity, such as one or more existing customer-generated policies that are within a customer account that includes the identity. In some examples, the available policy set may be generated by the identity management service based on one or more stored lists of existing policies that are compiled and updated by the identity management service. For example, the identity management service may compile and update a stored list of existing service-generated policies. Additionally, in some examples, the identity management service may also compile and update one or more stored lists of existing customer-generated policies. In one specific example, for each customer account, the identity management service may compile and update a respective list of existing customer-generated policies that have been created by, and/or that or available to, a corresponding customer account. Thus, existing customer-generated policies that are available to the identity may be determined based on a stored list of existing customer-generated policies for the account in which the identity is included.

At operation 1012, selected permissions associated with permission-usage by the identity are determined. The selected permissions may be determined by the identity management service, for example based on permissions usage data for the identity and optionally other identities (e.g., other identities within the same account and/or a global pool of identities) that may be compiled and updated by the identity management service. The selected permissions may include, for example, permissions that have been used by the identity within a selected prior time window (e.g., within the past 90 days). For example, the identity management service may track usage of permissions by the identity as part of the permissions usage data. In some examples, the selected permissions may also include other permissions, such as permissions selected manually by the customer, a union of permissions across multiple policies that are currently attached to the identity (if the identity currently has attached policies), and the like. In one specific example, the selected permissions may also include, for example, permissions that are estimated to have greater than a threshold probability of being used, by the identity, in a future time period. For example, in some cases, machine learning components that employ a machine learning model may evaluate a given identity's current attached permissions and prior usage of the current attached permissions. In some examples, based at least in part on the current attached permissions and prior usage of the current attached permissions, the machine learning model may be configured to identify permissions that have not been used, by the given identity, within a previous prior time window (e.g., within the past 90 days) but that are nevertheless likely to be used in the future. In order to make these determinations, the machine learning models may attempt to determine patterns, such as patterns of repeat permissions usage by individual identities as well as patterns of permission usage by large groups of identities. For example, if a given identity were to use a particular permission every 150 days, this usage pattern may strongly suggest that the permissions may be used again at the next 150 day interval, even if the permission has not been used within the past 90 days. As another example, a pattern may identify that Service X and Service Y have been frequently used together by a large quantity of identities. Now suppose that a given identity has used Service X several times within the past 90 days but has never used Service Y. In this example, the given identity may be considered to have a high probability of using Service Y in the future (because Service Y is frequently used with Service X) even though the given identity has never used Service Y in the past.

At operation 1014, it is determined whether the available policy set includes one or more matching policy subsets that cover all the selected permissions without allowing any additional permissions. This may include determining if the available policy set includes one or more matching policy subsets that cover all the selected permissions without allowing any additional permissions—or if the available policy set does not include one or more matching policy subsets that cover all the selected permissions without allowing any additional permissions. In some examples, operation 1014 may be performed by recommendations component 110, such as by employing linear programming calculations, for example performed by linear programming components 113, which may execute on one or more computing devices. The calculations employed to perform operation 1014 may include, for example, one or more of formulas 400-600 of FIGS. 4-6. In some examples, the determining of whether the available policy set includes the one or more matching policy subsets that cover all the selected permissions without allowing any of the additional permissions may be performed at a service-level granularity (e.g., via service-level formula 400), an individual action-level granularity (e.g., via individual action-level formula 500) and/or at an action category-level granularity (e.g., via action category-level formula 600). In some examples, operation 1014 may include determining one or more matching policy subsets that cover all the selected permissions without allowing any additional permissions and that include a minimum number of policies (e.g., as specified via terms 401, 501 and 601). Also, in some examples, each of the one or more matching subsets may be limited to no more than a threshold quantity of policies (e.g., as specified via constraints 402, 502 and 602).

When the available policy set includes the one or more matching policy subsets, a first recommendation is provided, to a user, to attach, to the identity, at least one matching policy subset of the one or more matching policy subsets (at operation 1016). Some example techniques for performing operation 1016 are described in detail below with reference to FIG. 11. In some examples, the at least one matching policy subset of the one or more matching policy subsets may be selected for recommendation based on including a fewest quantity of policies of the one or more matching policy subsets (e.g., as specified via terms 401, 501 and 601).

By contrast, when the available policy set doesn't include the one or more matching policy subsets, a second recommendation is provided, to a user, to attach, to the identity, one or more alternative policies (at operation 1018). In some examples, operation 1018 may include one of sub-operations 1018A, 1018B or 1018C. At sub-operation 1018A, it is recommended that the customer create a new policy to attach to the identity. Thus, when sub-operation 1018A is performed, the second recommendation may comprise a recommendation to create a new policy that covers all the selected permissions without allowing any of the additional permissions.

At sub-operation 1018B, an alternative policy subset of the available policy set is recommended, based on selected criteria, to attach to the identity. Thus, when sub-operation 1018B is performed, the second recommendation may comprise a recommendation to employ an alternative policy subset of the available policy set. The alternative policy subset may be a subset of the available policy set that does not exactly match the identity's security requirements but that provides a close approximation of the identity's security requirements. Specifically, in some examples, the second recommendation may comprise a recommendation to attach, to the identity, an alternative policy subset of the available policy set that that covers all the selected permissions while allowing a minimum quantity of the additional permissions (i.e., that includes an equal or smaller quantity of the additional permissions than any other subset of the available policies that covers all the selected permissions). Also, in some examples, the second recommendation may comprise a recommendation to attach, to the identity, an alternative policy subset of the available policy set that doesn't allow any of the additional permissions while covering a maximum amount of the selected permissions (i.e., that includes an equal or greater quantity of the selected permissions than any other subset of the available policies that includes no additional permissions). Furthermore, in some examples, the second recommendation may comprise a recommendation to attach, to the identity, an alternative policy subset of the available policy set that is selected based at least in part on permissions weighting (e.g., to favor allowing additional permissions in the same action category as a selected permission, to favor allowing additional permissions that are considered a low security risk, etc.).

At sub-operation 1018C, an alternative policy subset is recommended to attach to the identity, and it also recommended that the customer create a new policy to attach to the identity, such as to use as a gap filler for the alternative policy subset. For example, in some cases, the alternative policy subset might cover most of the selected permissions but may fail to cover a small remaining quantity of the selected permissions. In this example, the customer could generate a new policy to cover these remaining selected permissions. Also, in some examples, the alternative policy subset might provide a small quantity of additional permissions that are not included in the selected permissions. In this example, the customer could generate a new policy to exclude these additional permissions from the identity.

Figure 11:
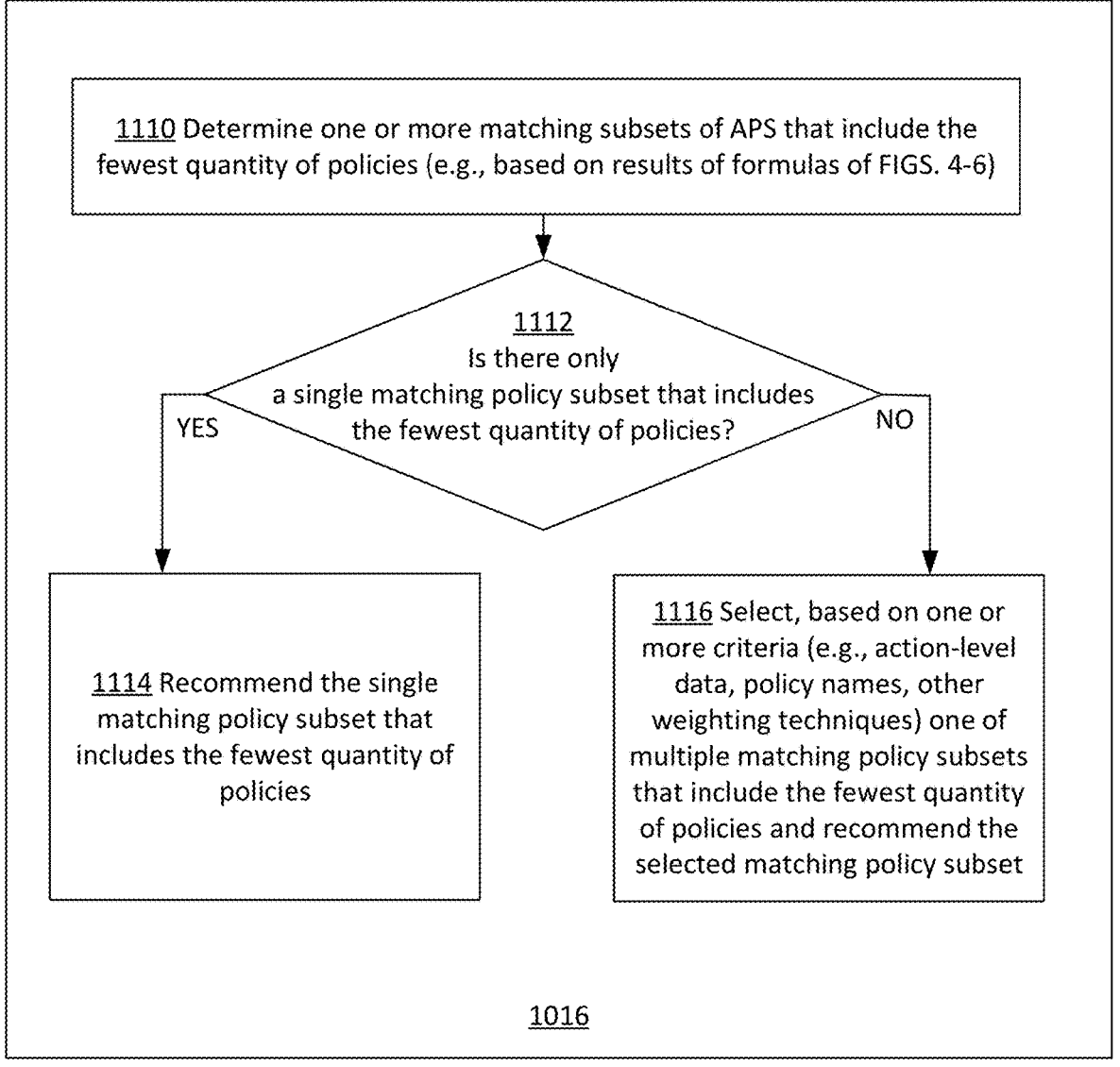
FIG. 11 is a flowchart illustrating an example matching policy subset selection process that may be used in accordance with the present disclosure.

FIG. 11 is a flowchart illustrating an example matching policy subset selection process that may be used in accordance with the present disclosure. In some examples, the process of FIG. 11 may be employed to perform operation 1016 of FIG. 10. Thus, in some examples, operation 1016 of FIG. 10 may include operations 1110-1116 of FIG. 11. The process of FIG. 11 is initiated at operation 1110, at which one or more matching subsets of the available policy set that include the fewest quantity of policies are determined. As described above with reference to operation 1014 of FIG. 10, a selected formula (e.g., one of formulas 400-600 of FIGS. 4-6) may be employed to determine one or more matching subsets of the available policy set that include the minimum quantity of policies (e.g., as specified via terms 401, 501 and 601) that cover all of the selected permissions without allowing any additional permissions. Thus, in some examples, operation 1110 may include identifying the matching policy subsets that are returned by execution of the selected formula.

At operation 1112, it is determined if there is only a single matching policy subset that includes the fewest quantity of policies. For example, in some cases, if execution of a selected formula (e.g., one of formulas 400-600 of FIGS. 4-6) returns only a single result (i.e., a single matching policy subset), then it may be determined that there is only a single matching policy subset that includes the fewest quantity of policies. In this scenario, there is no need for a "tie-breaker" because only a single result is returned. Thus, if there is only a single matching policy subset that includes the fewest quantity of policies, then, at operation 1114, the single matching policy subset that includes the fewest quantity of policies is recommended for the identity.

By contrast, if execution of a selected formula (e.g., one of formulas 400-600 of FIGS. 4-6) returns multiple results (i.e., multiple matching policy subsets), then it may be determined that are multiple matching policy subsets that include the fewest quantity of policies. In this scenario, there is a need for a "tie-breaker" because multiple results are returned. Thus, if there isn't only a single matching policy subset that includes the fewest quantity of policies, then, at operation 1116, one of the multiple matching policy subsets that include the fewest quantity of policies is selected based on one or more criteria (e.g., action-level data, policy names, other weighting techniques). The selected matching policy subset is then recommended for the identity. For example, in some cases, matching policy determinations may be performed at a service-level granularity 201, such as using service-level formula 400 of FIG. 4. When service-level formula 400 returns multiple results, action-level data may sometimes be used as a "tie-breaker" to select one of the multiple results. For example, consider a scenario in which one of the selected permissions is SeviceX-PutObject and a given policy (Policy A) provides only a ServiceX-PutObject permission and another given policy (Policy B) provides only the ServiceX-CreateBucket permission. In this example, with service-level granularity, both Policy A and Policy B would be considered to cover the SeviceX-PutObject permission (because both policies include permissions for ServiceX), even though PutObject is a different action than CreateBucket. However, by looking at action-level data, it may be determined that Policy A is actually a better match to the identity than Policy B (because the PutObject permission in Policy A exactly matches the identity's selected permissions). Thus, in some examples, a matching policy subset including Policy A may be recommended, for the identity, over a matching policy subset including Policy B. Similarly, in some cases, matching policy determinations may be performed at an action category-level granularity 202, such as using action category-level formula 600 of FIG. 6. When action category-level formula 600 returns multiple results, a similar analysis may also be employed as a "tie-breaker." For example, consider the same scenario in which one of the selected permissions is SeviceX-PutObject and a given policy (Policy A) provides only a ServiceX-PutObject permission and another given policy (Policy B) provides only the ServiceX-CreateBucket permission. In this example, with action category-level granularity, both Policy A and Policy B would be considered to cover the SeviceX-PutObject permission (because both policies include permissions for ServiceX in the write category), even though PutObject is a different action than CreateBucket. However, by looking at action-level data, it may be determined that Policy A is actually a better match to the identity than Policy B (because the PutObject permission in Policy A exactly matches the identity's selected permissions). Thus, in some examples, a matching policy subset including Policy A may be recommended, for the identity, over a matching policy subset including Policy B. In yet other examples, policy names may be used as a "tie-breaker", such as by selecting a policy with a name that most closely matches a name of the identity. Any combinations of these other criteria may be used.

Policy Determinations for an Identity Set

Techniques for new and existing policy determinations for an identity set are also described herein. The described techniques may be employed by an identity management service, which may allow customers to control and manage access to computing services and resources by creating identities (e.g., users, groups, roles, etc.) and defining permissions for the identities. The identity management service may provide recommendations to a customer regarding new and/or existing policies that may be used for a set of identities, such as identities within a customer account. In some examples, the identity management service may perform an individual analysis on each of the identities in the set of identities to determine for which, if any, of the identities, there is a group of one or more existing policies that satisfies a set of existing policy constraints. For each identity, the set of existing policy constraints may include, for example, a constraint that the group of one or more existing policies must include all selected permissions for the identity, a constraint that the group of one or more existing policies must not exceed a maximum additional permission threshold for the identity, a constraint that the group of one or more existing policies must not exceed a maximum policy quantity threshold, and/or other constraints. For each identity for which the set of existing policy constraints are satisfied, the identity may be placed into an existing policy identity pool. The service may provide, to a user, a recommendation to attach, to the identity, the group of one or more existing policies that satisfy the existing policy constraints.

By contrast, the identities for which the set of existing policy constraints is not satisfied may be placed into a new policy identity pool. The service may generate one or more new policies for attachment to the identities in the new policy identity pool. Specifically, in some examples, the service may generate a new policy that corresponds to a largest group of identities, within the new policy identity pool, for which a set of new policy constraints are satisfied. The set of new policy constraints may include, for example, a constraint that the new policy must include the selected permissions for each identity within the largest group of identities, a constraint that the new policy must not exceed one or more maximum additional permission thresholds, a constraint that the new policy must not exceed a maximum permission quantity threshold, and/or other constraints. The service may provide, to the user, a recommendation to attach, to each of the identities in the largest group of identities, the new policy that satisfies the new policy constraints.

In some examples, once a first new policy is generated for a respective group of identities, those identities may be removed from the new policy identity pool. The service may then repeat the new policy generation process, such as by generating a second new policy that corresponds to a largest group of identities, within the remaining identities of the new policy identity pool, for which the set of new policy constraints are satisfied. Once the second new policy is generated for a respective group of identities, those identities may be removed from the new policy identity pool. In each iteration of this process, a new policy is generated that satisfies the new policy constraints for a current largest group of identities within the new policy identity pool.

It is noted that the techniques described herein may provide a number of advantages. For example, by first determining each identity for which the set of existing policy constraints is satisfied, the service may recommend existing policies (as opposed to new policies) for these identities.

This may help to ensure that new policies are generated only for identities for which existing policies are unsuitable, thereby reducing the quantity of new policies that need to be generated and that need to be managed by customers. Additionally, for scenarios in which a new policy is required, the techniques described herein may assist to reduce customer work and frustration. For example, by creating a new policy for the largest group of identities for which the new policy constraints are satisfied, the overall quantity of new policies that are generated on the user's behalf may be minimized, thereby also reducing the quantity of policies that need to be managed by the customer. Furthermore, the new policy constraints that are used to create the new policy may help to ensure that the new policy complies with the customer's requirements. For example, in some cases, the customer may set various constraints, such as threshold quantities of additional permissions for the new policies, a maximum permission threshold for the new policies, and the like.

Figure 12:
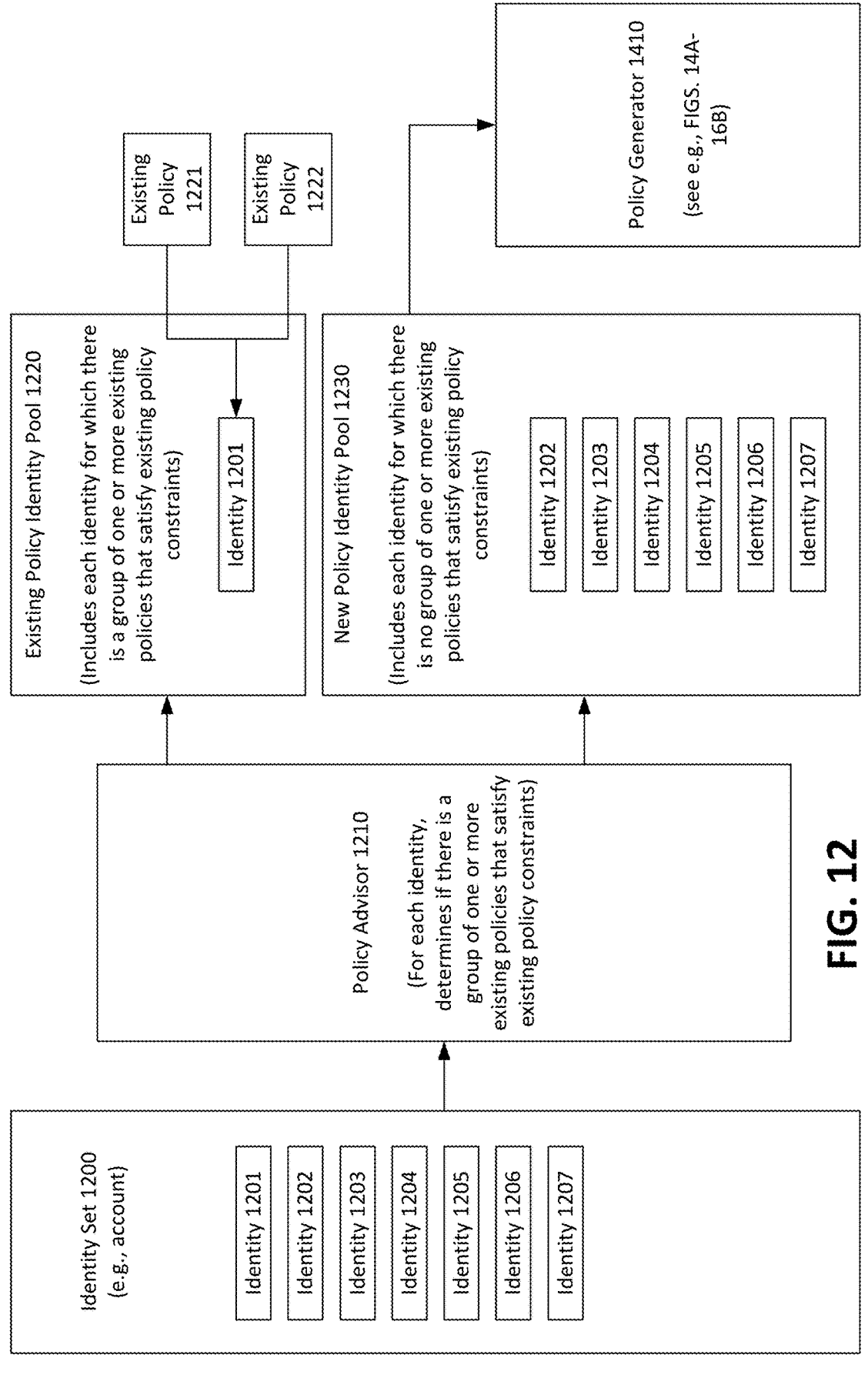
FIG. 12 is a diagram illustrating formation of new policy and existing policy identity pools that may be used in accordance with the present disclosure.

FIG. 12 is a diagram illustrating formation of an existing policy identity pool 1220 and a new policy identity pool 1230 that may be used in accordance with the present disclosure. As shown in FIG. 12, an identity set 1200 includes identities 1201-1207 (any given individual one of which is referred to hereinafter as an identity 1201-1207 or the identity 1201-1207). In some examples, identity set 1200 may correspond to an account of a customer of an identity management service, such that each identity within the account is included in the identity set 1200. In the example of FIG. 12, identity set 1200 is provided to policy advisor 1210, which is a computing component that individually and separately evaluates each identity 1201-1207 within the identity set 1200 to determine whether there is a group of one or more existing policies that satisfy a set of existing policy constraints for the identity 1201-1207. In some examples, policy advisor 1210 may include recommendations component 110 of FIG. 1, the operation of which is described in detail above with reference to FIGS. 1-11. Additionally, in some examples, policy advisor 1210 may include one or more linear programming components, such as linear programming components 113 of FIG. 1.

In some examples, the group of one or more existing policies that satisfy the set of existing policy constraints may include one or more existing service-generated policies and/or one or more existing customer-generated policies. Additionally, in some examples, the group of one or more existing policies that satisfy the set of existing policy constraints may include a subset of available policy set (APS) 101 of FIG. 1. As described above with reference to FIG. 1, an available policy set 101 may be determined for an identity (e.g., identity 100 of FIG. 1 or an 1201-1207 of FIG. 12). In this example, the available policy set 101 is a set of existing policies that are available to the identity. The available policy set 101 may include, for example, one or more existing service-generated policies that are generated by the identity management service. The available policy set 101 may also include, for example, one or more existing customer-generated policies that are available to the identity, such as one or more existing customer-generated policies that are within a same customer account as the identity 1201-1207.

Figure 13:
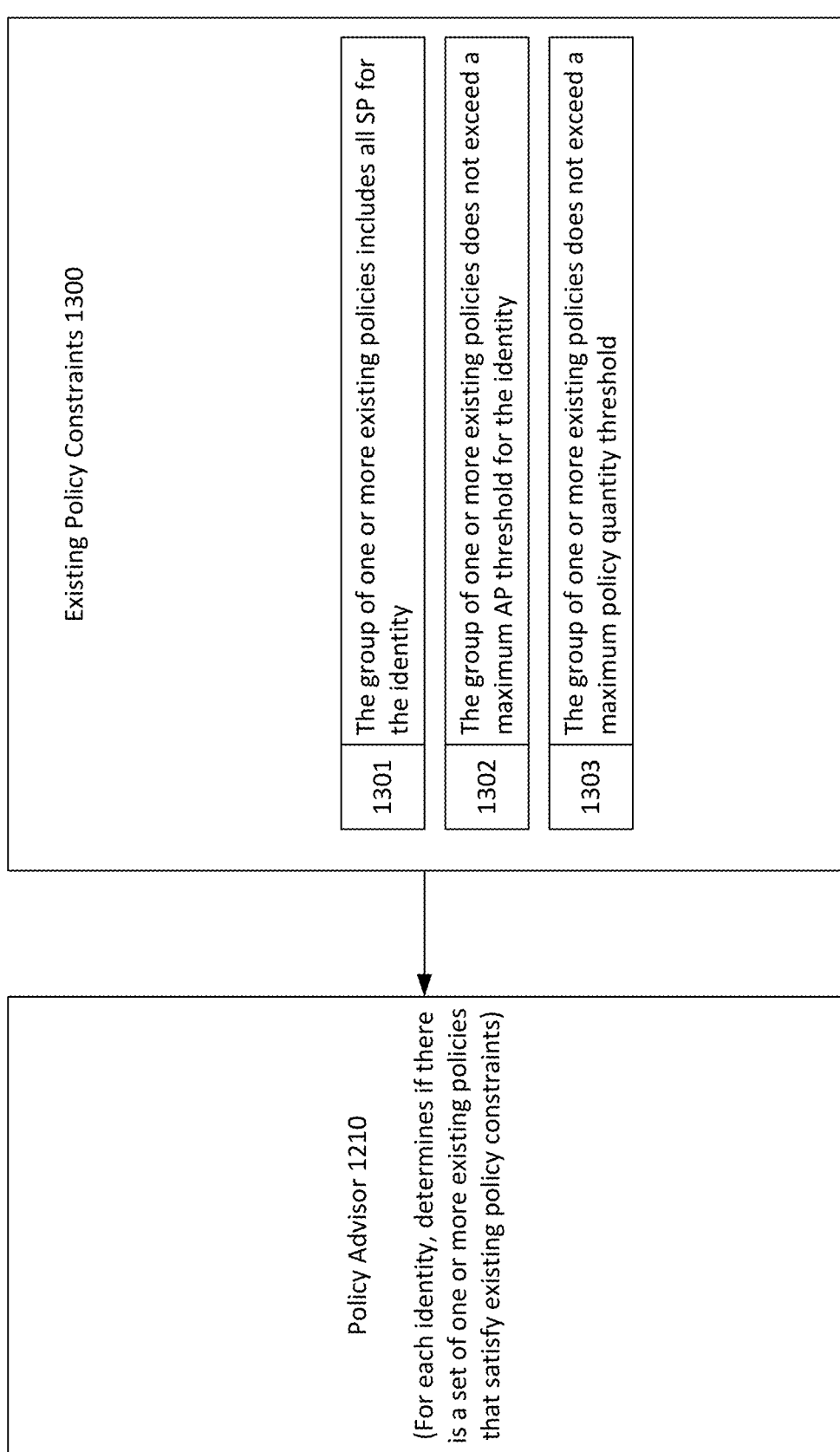
FIG. 13 is a diagram illustrating example existing policy constraints that may be used in accordance with the present disclosure.

Referring now to FIG. 13, existing policy constraints 1300 are shown. Existing policy constraints 1300 are an example of a set of existing policy constraints that may be employed by policy advisor 1210. In the example of FIG. 13, existing policy constraints 1300 include a constraint 1301 that the group of one or more existing policies must include all selected permissions (SP) 102 for an identity 1201-1207. The selected permissions 102 for an identity are described in detail above with reference to FIG. 1. The selected permissions 102 are permissions associated with permission-usage by an identity (e.g., identity 100 of FIG. 1 or an 1201-1207 of FIG. 12). The selected permissions 102 may include, for example, permissions that have been used by the identity within a selected prior time window (e.g., within the past 90 days). In some examples, the selected permissions 102 may also include other permissions, such as permissions selected manually by the customer, a union of permissions across multiple policies that are currently attached to the identity (if the identity currently has attached policies), and the like. In one specific example, the selected permissions 102 may also include, for example, permissions that are estimated to have greater than a threshold probability of being used, by the identity, in a future time period, such as may be determined by one or more machine learning components as described in detail above with reference to FIG. 1.

In the example of FIG. 13, existing policy constraints 1300 also include a constraint 1302 that the group of one or more existing policies does not exceed a maximum additional permission (AP) threshold. In some examples, the maximum additional permission threshold may be set by a customer, by the service, and/or by any other entities. As described above, the term additional permissions, as used herein, refers to permissions that are not included in the selected permissions 102 for an identity 1201-1207. The maximum additional permission threshold is an upper limit on how many additional permissions may be granted by the group of one or more existing policies without violating the existing policy constraints 1300. In some examples, all identities 1201-1207 may have the same maximum additional permission threshold. By contrast, in some examples, each identity 1201-208 may have its own respective maximum additional permission threshold, which may optionally be different for each of the identities 1201-1207. In some examples, a maximum additional permission threshold may be zero, meaning that the group of one or more existing policies cannot allow any additional permissions. By contrast, in some examples, a maximum additional permission threshold may be higher than zero. For example, if a maximum additional permission threshold is five, then the group of one or more existing policies may allow five or less additional permissions. In the example of FIGS. 4-6, the Greek letter lowercase Xi ($\xi$) is used to represent the maximum additional permission threshold, which may be zero or greater than zero in the examples of FIGS. 4-6.

In the example of FIG. 13, existing policy constraints 1300 also include a constraint 1303 that the group of one or more existing policies does not exceed a maximum policy quantity threshold. In some examples, the maximum policy quantity threshold may be set by a customer, by the service, and/or by any other entities. The maximum policy quantity threshold is an upper limit on how many policies the group of one or more existing policies may include without violating the existing policy constraints 1300. It is noted that constraints 1301-1303 are merely examples of constraints that may be included in existing policy constraints 1300, and any, or all, of constraints 1301-1303 may be wholly or partially modified or omitted from existing policy constraints 1300. Moreover, existing policy constraints 1300 may optionally include any number of additional constraints (not shown in FIG. 13).

In some examples, in order to determine whether there is a group of one or more existing policies that satisfy the existing policy constraints 1300 for an identity 1201-1207, the policy advisor 1210 may perform any, or all, of the calculations represented by service-level formula 400 of FIG. 4, action-level formula 500 of FIG. 5 and action category-level formula 600 (referred to collectively hereinafter as formulas 400-600) described above. Specifically, as described above, each of formulas 400-600 will select a group of one or more existing policies (also referred to as a matching policy subset in the corresponding description of FIGS. 4-6) having the minimum quantity of policies that satisfy the constraints 402-405, 502-505 or 602-605, respectively, which correspond to existing policy constraints 1300. As should be appreciated, if there is no group of one or more existing policies that satisfy existing policy constraints 1300, then formulas 400-600 will not return a valid solution. It is noted that constraint 1301 of FIG. 13 corresponds to constraints 403, 503 and 603 of FIGS. 4-6. It is also noted that constraint 1302 of FIG. 13 corresponds to constraints 404, 504 and 604 of FIGS. 4-6. It is also noted that constraint 1303 of FIG. 13 corresponds to constraints 402, 502 and 602 of FIGS. 4-6. As described above, service-level formula 400 is for the service-level granularity, action-level formula 500 of FIG. 5 is for the action-level granularity, and action category-level formula 600 is for the action category-level granularity. The use of each of these different granularities is described in detail above and not repeated here.

Referring back to FIG. 12, it is shown that the policy advisor 1210 may divide the identity set 1200 into an existing policy identity pool 1220 and a new policy identity pool 1230. The existing policy identity pool 1220 may include each of identities 1201-1207 for which there is a group of one or more existing policies that satisfies existing policy constraints 1300. In the example of FIG. 12, there is only a single identity (identity 1201) for which there is a group of one or more existing policies that satisfies existing policy constraints 1300. Thus, in the example of FIG. 12, existing policy identity pool 1220 includes only identity 1201. As shown in FIG. 12, the group of existing policies that satisfy the existing policy constraints 1300 for identity 1201 includes existing policy 1221 and existing policy 1222.

By contrast, the new policy identity pool 1230 may include each of identities 1201-1207 for which there is no group of one or more existing policies that satisfies existing policy constraints 1300. In the example of FIG. 12, there are six identities (identities 1202-1207) for which there no group of one or more existing policies that satisfies existing policy constraints 1300. Thus, in the example of FIG. 12, new policy identity pool 1230 includes identities 1202-1207. As shown in FIG. 12, the new policy identity pool is provided to policy generator 1410, which may generate new policies for the new policy identity pool 1230 as described in detail below with reference to FIGS. 14A-16.

Figure 14A:
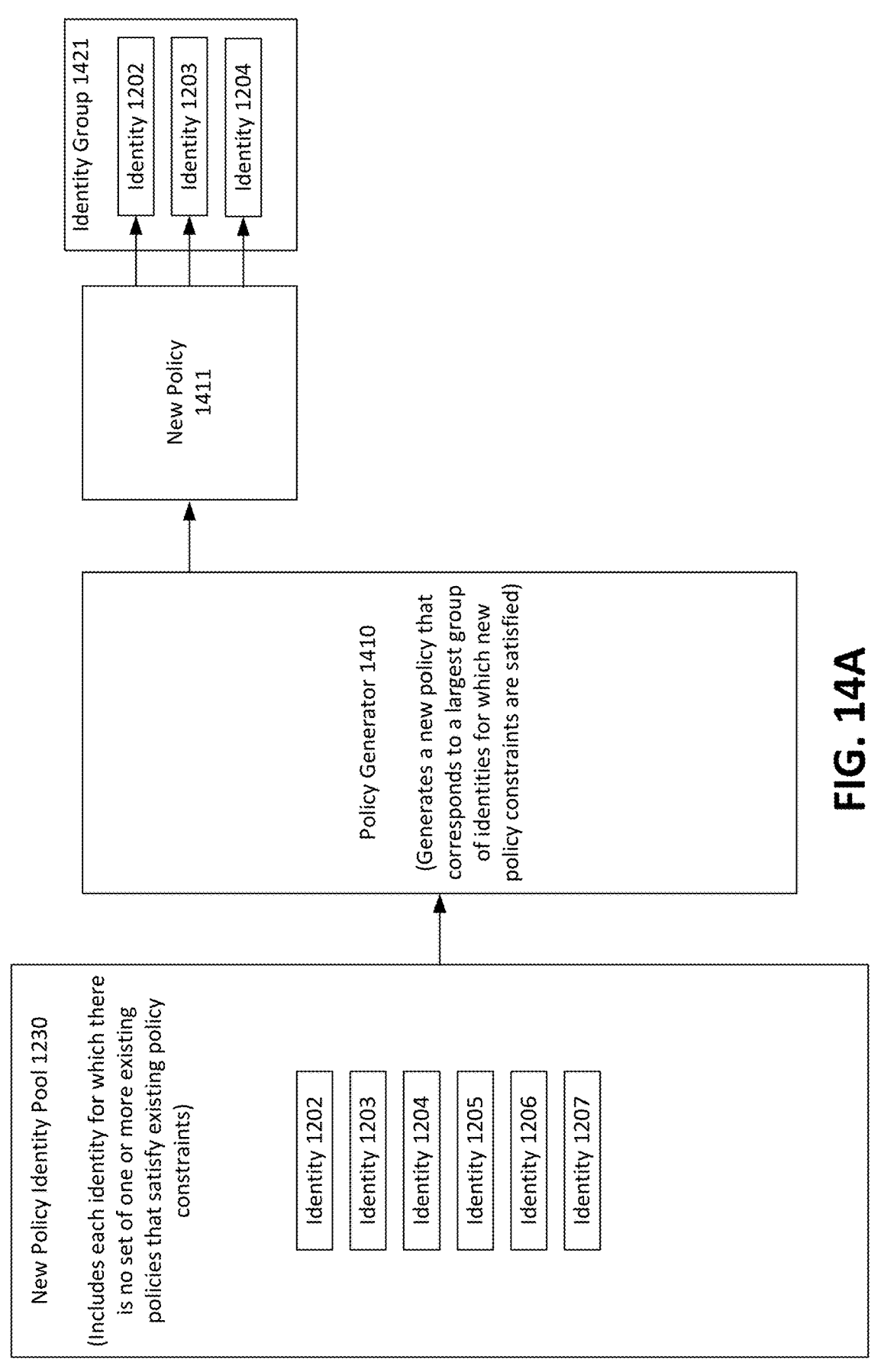

Referring now to FIG. 14A, some example techniques for new policy generation by policy generator 1410 will now be described in detail. As shown in FIG. 14A, new policy identity pool 1230, including identities 1202-1207 is provided to policy generator 1410. Policy generator 1410 is a compute component, which may include one or more linear programming components, such as for solving integer linear programming problems including, for example, new policy generation formula 1630 of FIG. 16B described in detail below. As will now be described in detail, policy generator 1410 generates a new policy 1411 for the largest group of identities (which, in the example of FIG. 14A, is identity group 1421) within the new policy identity pool 1230 for which a set of new policy constraints (e.g., new policy constraints 1500 of FIG. 15) are satisfied. As shown, in the example of FIG. 14A, policy generator 1410 generates new policy 1411 for identity group 1421, which includes identities 1202-1204.

Figure 14B:
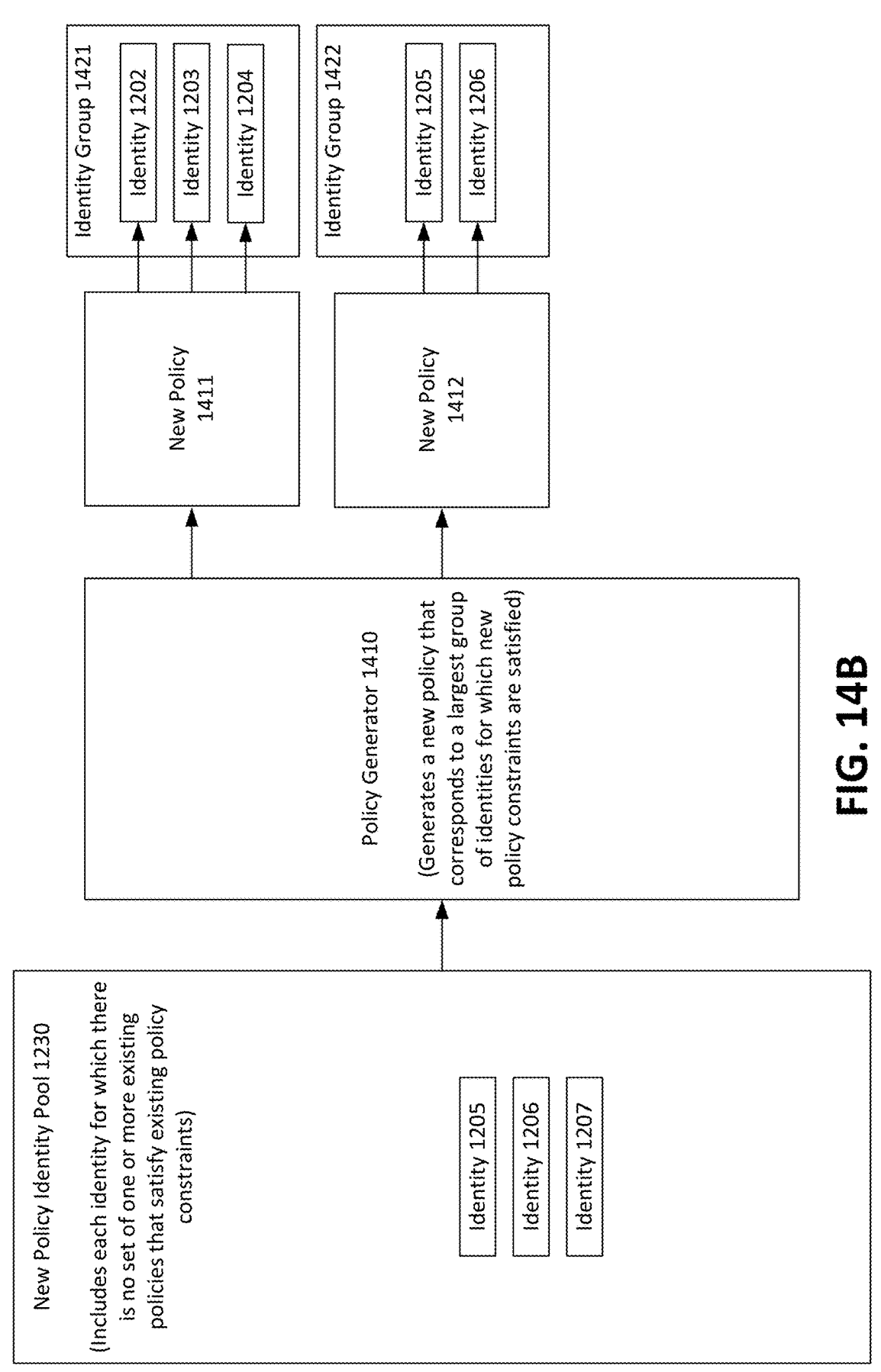

Once a new policy has been generated for the largest group of identities, that group of identities may be removed from the new policy identity pool 1230. Policy generator 1410 may then generate another new policy for the largest group of identities remaining within the new policy identity pool 1230. This process of generating new policies and removing groups of identities from the new policy identity pool 1230 may be repeated any number of times until the new policy identity pool 1230 is empty, meaning that there are no identities remaining within the new policy identity pool 1230. For example, referring now to FIG. 14B, it is shown that, subsequent to generation of new policy 1411 for identities 1202-1204 (as described above with reference to FIG. 14A), identities 1202-1204 are removed from the new policy identity pool 1230. As shown in FIG. 14B, the removal of identities 1202-1204 leaves only identities 1205-1207 remaining in the new policy identity pool 1230. As also shown in FIG. 14B, policy generator 1410 then generates a new policy 1412 for the largest group of identities (which, in the example of FIG. 14B, is identity group 1422) remaining within the new policy identity pool 1230 for which a set of new policy constraints (e.g., new policy constraints 1500 of FIG. 15) are satisfied. As shown, in the example of FIG. 14B, policy generator 1410 generates new policy 1412 for identity group 1422, which includes identities 1205-1206.

Figure 14C:
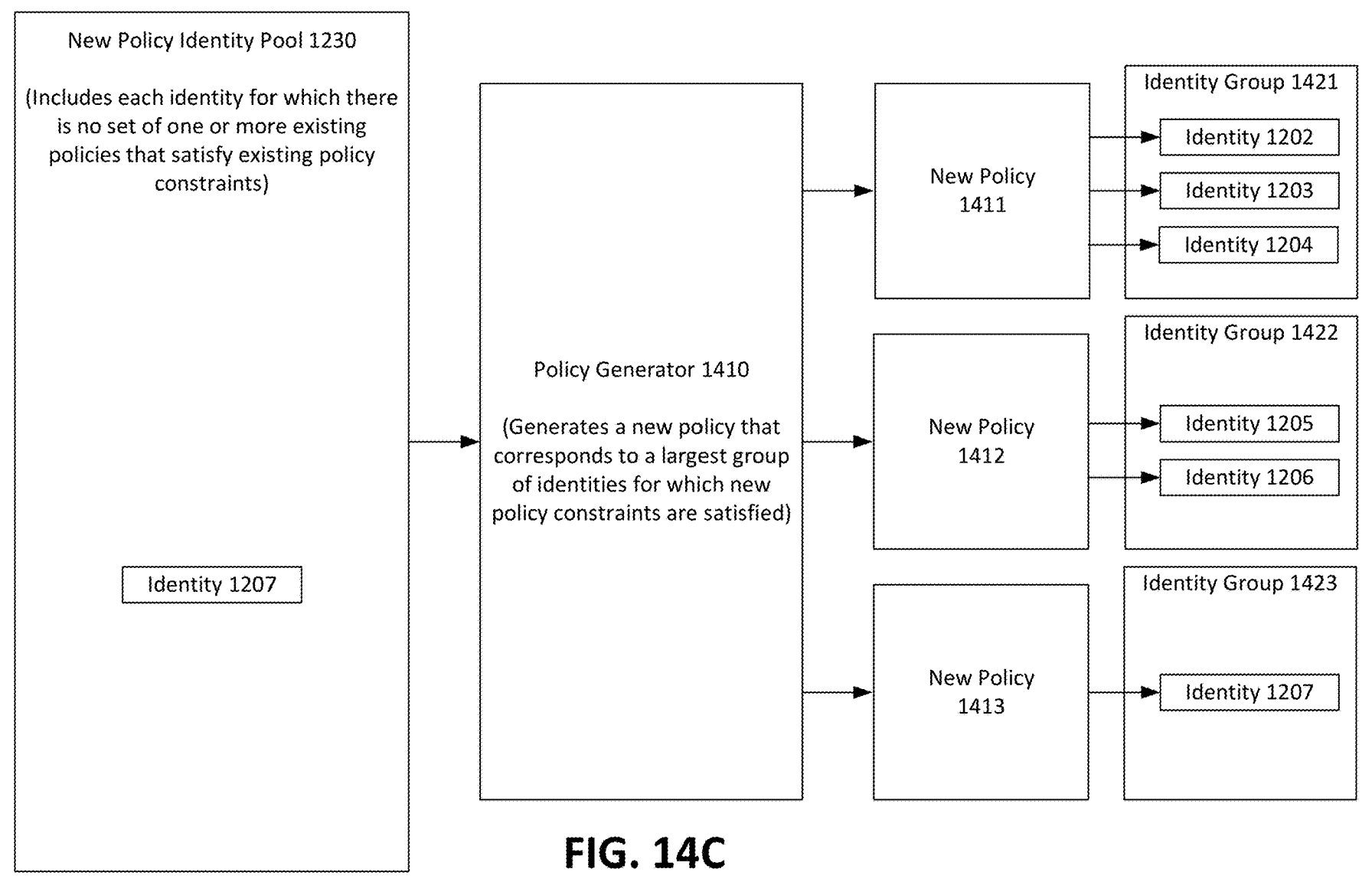

Referring now FIG. 14C, it is shown that, subsequent to generation of new policy 1412 for identities 1205-1206 (as described above with reference to FIG. 14B), identities 1205-1206 are removed from the new policy identity pool 1230. As shown in FIG. 14C, the removal of identities 1205-1206 leaves only identity 1207 remaining in the new policy identity pool 1230. As also shown in FIG. 14C, policy generator 1410 then generates a new policy 1413 for the largest group of identities (which, in the example of FIG. 14C, is identity group 1423) remaining within the new policy identity pool 1230 for which a set of new policy constraints (e.g., new policy constraints 1500 of FIG. 15) are satisfied. As shown, in the example of FIG. 14C, policy generator 1410 generates new policy 1413 for identity group 1423, which includes only identity 1207. Subsequent to generation of new policy 1413 for identity 1207, identity 1207 is removed from the new policy identity pool 1230. Upon removal of identity 1207 from the new policy identity pool 1230, the new policy identity pool 1230 is emptied and the new policy generation process is completed. In some examples, at least one of the largest groups of identities that are formed during the new policy generation process may include more than one identity. For example, identity groups 1421 and 1422 both include more than one identity. It is noted that, in some examples, there may be multiple largest groups of identities that satisfy the set of new policy constraints and that include the same quantity of identities (meaning that there is a tie between these multiple groups of identities). In this scenario, any one of these groups may be selected as the largest group of identities, and the process may then be repeated.

Referring now to FIG. 15, new policy constraints 1500 are shown. New policy constraints 1500 are an example of a set of new policy constraints that may be employed by policy generator 1410. In the example of FIG. 15, new policy constraints 1500 include a constraint 1501 that the new policy must include all selected permissions (SP) for each identity within the largest identity group. The selected permissions 102 for an identity are described in detail above with reference to FIG. 1. The selected permissions 102 are permissions associated with permission-usage by an identity (e.g., identity 1201 of FIG. 1 or an identity 1202-1207 of FIG. 14A). The selected permissions 102 may include, for example, permissions that have been used by the identity within a selected prior time window (e.g., within the past 90 days). In some examples, the selected permissions 102 may also include other permissions, such as permissions selected manually by the customer, a union of permissions across multiple policies that are currently attached to the identity (if the identity currently has attached policies), and the like. In one specific example, the selected permissions 102 may also include, for example, permissions that are estimated to have greater than a threshold probability of being used, by the identity, in a future time period, such as may be determined by one or more machine learning components as described in detail above with reference to FIG. 1.

In the example of FIG. 15, new policy constraints 1500 include a constraint 1502 that the new policy must not exceed one or more applicable maximum additional permission (AP) thresholds. In some examples, the one or more applicable maximum additional thresholds may be set by a customer, by the service, and/or by any other entities. As described above, the term additional permissions, as used herein, refers to permissions that are not included in the selected permissions 102 for an identity 1202-1207. An applicable maximum additional permission threshold is an upper limit on how many additional permissions may be granted by the new policy without violating the new policy constraints 1500. The one or more applicable maximum additional permission thresholds include one or more maximum additional permission thresholds that are applicable to the identities in the largest identity group. As described above, in some examples, all identities may have the same maximum additional permission threshold. In this scenario, there will only be one applicable maximum additional permission threshold that is used for all identities. By contrast, in some examples, each identity (or at least some of the identities) may have their own respective maximum additional permission thresholds, which may be different from one another. In this scenario, there may be a plurality of different applicable maximum additional permission thresholds. It is noted that, for scenarios in which there are a plurality of different applicable maximum additional permission thresholds, each threshold need only be satisfied for the identity to which the threshold applies (and not to all identities in the largest identity group). For example, if a first identity has a threshold of five and a second identity has a threshold of ten, then the threshold of five only applies to the first identity, and the threshold of ten only applies to the second identity. For example, if the new policy grants seven additional permissions to the first identity, then this will violate the constraint 1502 because seven exceeds the first identity's threshold of five. By contrast, if the new policy grants seven additional permissions to the second identity, then this will not violate the constraint 1502 because seven does not exceed the second identity's threshold of ten.

In the example of FIG. 15, new policy constraints 1500 also include a constraint 1503 that the new policy does not exceed a maximum permission quantity threshold. In some examples, the maximum permission quantity threshold may be set by a customer, by the service, and/or by any other entities. The maximum permission quantity threshold is an upper limit on how many permissions the new policy may include without violating the new policy constraints 1500. The maximum permission quantity threshold may prevent the new policy from including too many permissions, which may make the new policy difficult and cumbersome for a customer to manage. It is noted that constraints 1501-1503 are merely examples of constraints that may be included in new policy constraints 1500, and any, or all, of constraints 1501-1503 may be wholly or partially modified or omitted from new policy constraints 1500. Moreover, new policy constraints 1500 may optionally include any number of additional constraints (not shown in FIG. 15).

Referring now to FIGS. 16A-B, some example definitions and formulas relating to generating of new policies 1411-1413 will now be described in detail. In the example of FIGS. 16A-B, the letter (K) represents the current total quantity of identities in the new policy identity pool 1230. For example, in FIG. 14A, the new policy identity pool 1230 includes six identities (identities 1202-1207), so the value of (K) is six. As another example, in FIG. 14B, after identities 1202-1204 are removed, the new policy identity pool 1230 includes three identities (identities 1205-1207), so the value of (K) is three. Additionally, the uppercase letter (P) represents all permissions being considered by the policy generator 1410, which may include all permissions provided by a computing service provider associated with the identity management service, such as may include the combination of all services provided by the computing service provider and their associated actions. The lowercase letter (p) represents individual permissions, where $P=\{p_1, p_2, \ldots p_N\}$. The letter (N) therefore represents the total number of permissions. As shown in definition 1601, the letter (i) represents a given identity, and the letter (j) represents a given permission. The notation $(u_i)$ relates to selected permissions for a given identity (i). Specifically, as shown in definition 1601, vector $(u_i)$ represents the selected permissions for a given identity (i), where the vector has a value of zero or one for each permission (j) from 1 to (N). If permission (j) is a selected permission for identity (i), then $u_i[j]=1$; and zero otherwise. If all vectors $(u_i)$ are stacked, then a K×N matrix is generated, $U^T=[u_1, u_2, \ldots u_K]$, which may be referred to as the access matrix of the given K identities. Thus, if $U_{ij}=1$, it means that the identity (i) requires permission (j).

Additionally, the Greek letter lowercase Pi $(\pi)$ is used to represent the new policy. As shown in definition 1602, the new policy $(\pi)$ has an associated vector $(\pi)$ that has a value of zero or one for each permission (j) from 1 to (N). Definition 1603 shows that each permission $(p_j)$ exists from a value of 1 to (N). For each permission $(p_j)$, if policy $(\pi)$ grants access to $(p_j)$, then $\pi_j=1$; and zero otherwise. The Greek letter uppercase Xi $(\Xi)$ represents the maximum permission quantity threshold, as described above with reference to constraint 1503 of FIG. 15. The notation $(\delta_i)$ represents the maximum additional permission threshold for a given identity (i), as described above with reference to constraint 1502 of FIG. 15.

A new policy $(\pi)$ is considered to be attachable for a given identity (i) if the new policy $(\pi)$ is in a set of suitable policies for the given identity (i). A new policy $(\pi)$ is not suitable for an identity (i) if the new policy $(\pi)$ is less permissive than the selected permissions of that identity. A new policy $(\pi)$ is suitable for an identity (i) if the selected permissions for identity (i) are included in the set of permissions to which the new policy $(\pi)$ grants access. If new policy $(\pi)$ is suitable for identity (i) and is the only attached policy for identity (i), then there does not exist any permission (j) such that $\pi_j=0$ and $\pi_{ij}=1$. Thus, for all permissions (j), $\pi_j-\pi_{ij}=0$ if permission (j) is a selected permission for identity (i), and $\pi_j-\pi_{ij}=1$ if permission (j) is not a selected permission for identity (i). Therefore, the quantity of additional permissions for a given identity is shown in formula 1604. In formula 1604, $(UP_i)$ represents the quantity of additional permissions for a given identity (i). Thus, $(UP_i)$ is equal to the sum, from j=1 to j=N, of $\pi_j-\pi_{ij}$. Additionally, in formula 1604, the numeral (1) is a N-dimensional vector of all ones.

As shown in definition 1605, a variable $(\zeta_i)$ is defined. The variable $(\zeta_i)$ is equal to one if $U_{ij}$ is less than or equal to $\pi_j$ for all permissions (j). By contrast, the variable $(\zeta_i)$ is otherwise equal to zero. Thus, $\zeta_i=1$ if an identity (i) can use the new policy, and $\zeta_i=0$ otherwise. If the new policy $(\pi)$ is not suitable for identity (i), then there exists a permission (j) that is a selected permission for identity (i) (meaning that $U_{ij}=1$), but new policy $(\pi)$ does not grant that permission (meaning that $\pi_j=0$).

To maximize the number of identities in the current pool of (K) identities that can use the new policy $(\pi)$, the norm of the variable $(\zeta_i)$ is maximized. This may be performed via an optimization as shown in new policy generation formula 1630 of FIG. 16B. As shown in FIG. 16B, new policy generation formula 1630 includes term 1631, which indicates that new policy generation formula 1630 maximizes the variable $(\zeta_i)$ for a generated new policy that satisfies the conditions of new policy generation formula 1630 by satisfying constraints 1632-1634. The abbreviation s.t. in new policy generation formula 1630 (and other formulas described herein) means such that (i.e., such that constraints 1632-1634 are satisfied). Constraint 1632 ensures that the new policy generated by new policy generation formula 1630 does not exceed the maximum permission quantity threshold $(\Xi)$, as described above with reference to constraint 1503 of FIG. 15. This means that the new policy cannot grant access to more permissions than are specified by the maximum permission quantity threshold $(\Xi)$. Thus, constraint 1632 of FIG. 16 corresponds to constraint 1503 of FIG. 15.

Constraint 1633 ensures that a given identity (i) can only be considered as covered identity (meaning that $\zeta_i=1$) if the suggested new policy is not less permissive than the set of selected permissions for that identity (i). When $\zeta_i=0$, the greater than or equal to zero conditions included in constraint 1633 are always true for all permissions (j). However, when $\zeta_i=1$, the constraint 1633 enforces that, for all values of (j), $\pi_j-U_{ij}$ is greater than or equal to zero, which is the suitability condition of the new policy for identity (i). Thus, constraint 1633 corresponds to constraint 1501 of FIG. 15.

Constraint 1634 ensures that the quantity of additional permissions for each identity does not exceed the applicable maximum additional permission threshold for that identity. When $\zeta_i=0$, it is known based on constraint 1632 that the less than or equal to zero conditions of constraint 1634 will be satisfied. However, when $\zeta_i=1$, then, to satisfy the less than or equal to zero conditions of constraint 1634, the relationship 1640 must be true. The relationship 1640 satisfies the maximum additional permission threshold for identity (i). Thus, constraint 1634 ensures that the quantity of additional permission does not become greater than the maximum additional permission threshold for the identities that are going to use the new policy. Accordingly, constraint 1634 corresponds to constraint 1502 of FIG. 15.

This optimization problem shown in new policy generation formula 1630 has a linear objective function and all linear inequality constraints. However, since the optimization variables are integer, it is a non-convex problem. Non-convex problems are generally difficult to solve. However, since the objective function and all the constraints 1632-1634 are linear, the new policy generation formula 1630 may be solved efficiently. In some examples, a variety of integer linear programming techniques and algorithms may be employed for solving of the new policy generation formula 1630, and the techniques described herein are not limited to any particular technique or algorithm. The new policy generation formula 1630 has $2K+N+1$ constraints. The high number of constraints may make solving of the new policy generation formula 1630 slow for large K values.

In some examples, one or more simplification techniques may be employed in order to simplify the new policy generation formula 1630 and make it easier (e.g., faster) to solve. One example simplification technique involves reducing the quantity of total permissions (N) that are considered. In some cases, due to large quantities of available services and associated action permissions, the total quantity of considered permissions (N) may be quite large. Not all of these permissions are required for the identities being evaluated. In some examples, in order to reduce the total quantity of considered permissions (N), the considered permissions (N) may be reduced to include only the union of the selected permissions required by the current identities (K) in the new policy identity pool 1230. For example, for FIG. 14A, considered permissions (N) may be reduced to include only the union of the selected permissions required by the identities 1202-1207, which are the current identities (K) the new policy identity pool 1230. As another example, for FIG. 14B, considered permissions (N) may be reduced to include only the union of the selected permissions required by the identities 1205-1207, which are the current identities (K) the new policy identity pool 1230.

Another example simplification technique involves reducing the quantity of considered identities. It is common that multiple identities within a customer account may often require the same set of selected permissions. To improve the efficiency (e.g., speed) of solving the new policy generation formula 1630, the current identities (K) within the new policy identity pool 1230 (e.g., identities 1202-1207 in FIG. 4A) that have similar selected permissions may be clustered into a plurality of clusters (e.g., sub-pools). Notation 1651 of FIG. 16B shows how the summation notation of term 1631 appears without clustering of the identities. However, when the identities are clustered into a plurality of clusters, instead of maximizing notation 1651, the notation 1652 will instead be maximized by replacing notation 1651 with notation 1652 in term 1631. In notation 1652, $(w_i)$ represents the quantity of identities in a given cluster (i). The efficiency (e.g., speed) of solving the new policy generation formula 1630 may therefore be improved by reducing the quantity of considered identities from all identities in the new policy identity pool 1230 to the identities within a given cluster.

FIG. 17A is a flowchart illustrating an example process for formation of new policy and existing policy identity pools that may be used in accordance with the present disclosure. In some examples, any, or all, of the operations in FIG. 17A may be performed by an identity management service. The process of FIG. 17A is initiated at operation 1710, at which a request is received to recommend policies for an identity set. As described above, in some examples, an identity management service may receive this request from a customer. In some examples, the identity set may include all identities within a given customer account. For example, in some cases, the customer may request that the identity management service recommend policies for all identities in the given customer account. In some examples, the identity management service may provide a feature that recommends existing policies for each identity in the identity set that satisfy a set of existing policy constraints and that recommends new policies for identities in the identity set that do not satisfy the set of existing policy constraints. In some examples, the request received at operation 1710 may invoke this feature.

At operation 1712, selected permissions are determined for each identity in the identity set. As described above with reference to FIG. 1, the selected permissions (SP) 102 are permissions associated with permission-usage by an identity. The selected permissions 102 may include, for example, permissions that have been used by the identity within a selected prior time window (e.g., within the past 90 days). In some examples, the selected permissions 102 may also include other permissions, such as permissions selected manually by the customer, a union of permissions across multiple policies that are currently attached to the identity (if the identity currently has attached policies), and the like. In one specific example, the selected permissions 102 may also include, for example, permissions that are estimated to have greater than a threshold probability of being used, by the identity, in a future time period, such as may be determined by one or more machine learning components as described in detail above with reference to FIG. 1.

At operation 1713, an identity in the identity set is selected for evaluation. The following operations 1714-1720 are repeated to individually evaluate each identity in the identity set. There is no particular order in which the identities need to be evaluated, and the order in which the identities are evaluated may be determined at random or using any desired technique. Operations 1714-1720 are first performed for the identity selected at operation 1713.

At operation 1714, it is determined whether there is a group of one or more existing policies that satisfy existing policy constraints for the identity. As described above with reference to FIG. 13, the existing policy constraints 1300 may include a constraint 1301 that the group of one or more existing policies must include all selected permissions (SP) 102 for an identity. The existing policy constraints 1300 also include a constraint 1302 that the group of one or more existing policies does not exceed a maximum additional permission (AP) threshold. In some examples, the maximum additional permission threshold may be set by a customer, by the service, and/or by any other entities. As described above, the term additional permissions, as used herein, refers to permissions that are not included in the selected permissions 102 for an identity. The maximum additional permission threshold is an upper limit on how many additional permissions may be granted by the group of one or more existing policies without violating the existing policy constraints 1300. In some examples, all identities may have the same maximum additional permission threshold. By contrast, in some examples, each identity may have its own respective maximum additional permission threshold, which may optionally be different for each of the identities. In some examples, a maximum additional permission threshold may be zero, meaning that the group of one or more existing policies cannot allow any additional permissions. By contrast, in some examples, a maximum additional permission threshold may be higher than zero. For example, if a maximum additional permission threshold is five, then the group of one or more existing policies may allow five or less additional permissions. The existing policy constraints 1300 also include a constraint 1303 that the group of one or more existing policies does not exceed a maximum policy quantity threshold. In some examples, the maximum policy quantity threshold may be set by a customer, by the service, and/or by any other entities. The maximum policy quantity threshold is an upper limit on how many policies the group of one or more existing policies may include without violating the existing policy constraints 1300.

In some examples, in order to determine whether there is a group of one or more existing policies that satisfy the existing policy constraints 1300 for an identity, the policy advisor 1210 may perform one or more linear programming calculations. Some examples of the calculations that me be employed are represented by service-level formula 400 of FIG. 4, action-level formula 500 of FIG. 5 and action category-level formula 600 (referred to collectively hereinafter as formulas 400-600) described above. Specifically, as described above, each of formulas 400-600 will select a group of one or more existing policies (also referred to as a matching policy subset in the corresponding description of FIGS. 4-6) having the minimum quantity of policies that satisfy the constraints 402-405, 502-505 or 602-605, respectively, which correspond to existing policy constraints 1300. As should be appreciated, if there is no group of one or more existing policies that satisfy existing policy constraints 1300, then formulas 400-600 will not return a valid solution. It is noted that constraint 1301 of FIG. 13 corresponds to constraints 403, 503 and 603 of FIGS. 4-6. It is also noted that constraint 1302 of FIG. 13 corresponds to constraints 404, 504 and 604 of FIGS. 4-6. It is also noted that constraint 1303 of FIG. 13 corresponds to constraints 402, 502 and 602 of FIGS. 4-6. As described above, service-level formula 400 is for the service-level granularity, action-level formula 500 of FIG. 5 is for the action-level granularity, and action category-level formula 600 is for the action category-level granularity. The use of each of these different granularities is described in detail above and not repeated here.

If, at operation 1714, it is determined that there is a group of one or more existing policies that satisfy existing policy constraints for the identity, then, at operation 1716, the identity may be added to the existing policy identity pool, and an indication may be provided, to a user, to attach the group of one or more existing policies to the identity. For example, as shown in FIG. 12, it is determined that there is a group of existing policies (including existing policy 1221 and existing policy 1222) that satisfies existing policy constraints for the identity 1201. Identity 1201 is, therefore, added to the existing policy identity pool 1220. An indication may be provided, to a user, to attach the group of existing policies (including existing policy 1221 and existing policy 1222) to identity 1201. In some cases, there may be multiple groups of one or more existing policies that satisfy existing policy constraints for the identity. In these cases, the group of one or more existing policies that includes the fewest number of policies may be recommended to the customer for attachment to the identity. Some example techniques for selecting one of multiple groups of existing policies for recommendation to the customer are described in detail above, such as with respect to operation 1116 of FIG. 11, and this description is not repeated here.

If, at operation 1714, it is determined that there is no group of one or more existing policies that satisfy existing policy constraints for the identity, then, at operation 1718, the identity may be added to the new policy identity pool, and a new policy may be generated for attachment to the identity (as well as optionally one or more other identities in the new policy identity pool). For example, as shown in FIG. 12, it is determined that there is no group of existing policies that satisfies existing policy constraints for any of the identities 1202-1207. Identities 1202-1207 are, therefore, added to the new policy identity pool 1230. Some example techniques for generating one or more new policies for identities in the new policy identity pool are described above with reference to FIGS. 14A-16B and also described below with reference to FIG. 17B

At operation 1720, it is determined if all the identities in the identity set have been evaluated via operations 1714-1720. If all identities have not yet been evaluated, then, at operation 1722, a next identity in the identity set is selected, and operations 1714-1720 are repeated for the next selected identity. By contrast, if all identities in the identity set have been evaluated, then the process ends at operation 1724 and optionally proceeds to the process of FIG. 17B.

Figure 17B:
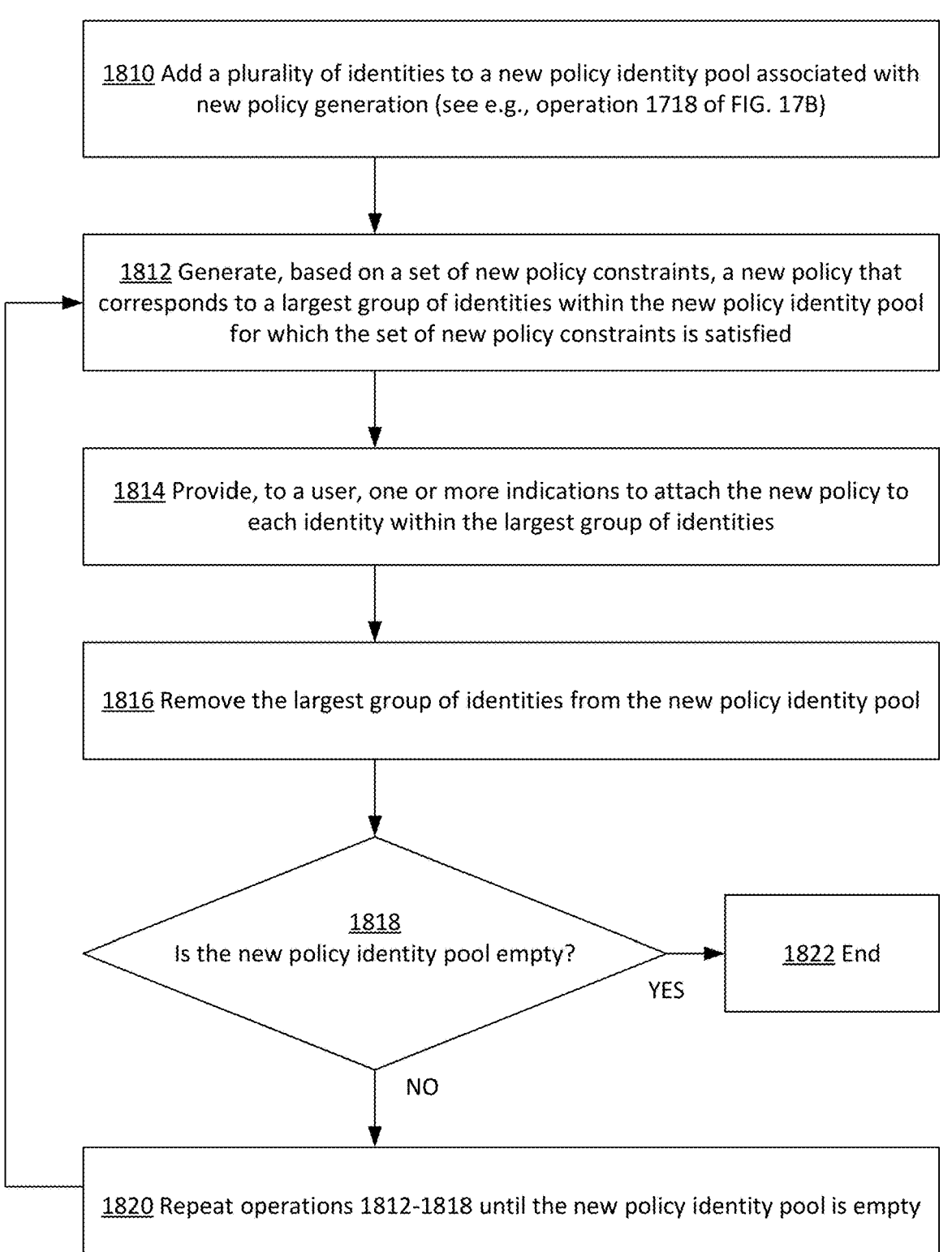
FIG. 17B is a flowchart illustrating an example new policy generation process that may be used in accordance with the present disclosure.

FIG. 17B is a flowchart illustrating an example new policy generation process that may be used in accordance with the present disclosure. In some examples, any, or all, of the operations in FIG. 17A may be performed by an identity management service. The process of FIG. 17A is initiated at operation 1810, at which a plurality of identities are added to a new policy identity pool associated with new policy generation. In some examples, the process of FIG. 17B may be performed subsequent to the process of FIG. 17A. Additionally, in some examples, the plurality of identities may be added to the new policy identity pool by performing operation 1718 of FIG. 17A. Thus, for scenarios in which the process of FIG. 17B is performed subsequent to the process of FIG. 17A, operation 1810 may be performed via operation 1718 of FIG. 17A and need not be duplicated.

An example of operation 1810 is shown in FIG. 12, which shows that identities 1202-1207 are added to new policy identity pool 1230. In some examples, it may be determined, individually for each identity of the plurality of identities, that there is no group of one or more existing policies that satisfies a set of existing policy constraints for the identity. Each identity of the plurality of identities may be added to the new policy identity pool based on there being no group of one or more existing policies that satisfies the set of existing policy constraints for the identity. Additionally, one or more new policies may be generated for the plurality of identities based on there being no group of one or more existing policies that satisfies the set of existing policy constraints for each identity in the plurality of identities. For example, as described above with reference to FIG. 12, it may be determined, individually for each of identities 1202-1207, that there is no group of one or more existing policies that satisfies a set of existing policy constraints for the identity 1202-1207. Each identity 1202-1207 may be added to the new policy identity pool 1230 based on there being no group of one or more existing policies that satisfies the set of existing policy constraints for the identity 1202-1207.

As also described above, each identity of the plurality of identities has respective selected permissions associated with permission usage by the identity. The respective selected permissions for each identity of the plurality of identities may be determined, such as based on techniques described in detail above. As described above, the selected permissions for an identity may be determined by the identity management service, for example based on permissions usage data for the identity and optionally other identities (e.g., other identities within the same account and/or a global pool of identities) that may be compiled and updated by the identity management service. The selected permissions may include, for example, permissions that have been used by the identity within a selected prior time window (e.g., within the past 90 days). For example, the identity management service may track usage of permissions by the identity as part of the permissions usage data. In some examples, the selected permissions may also include other permissions, such as permissions selected manually by the customer, a union of permissions across multiple policies that are currently attached to the identity (if the identity currently has attached policies), and the like. In one specific example, the selected permissions may also include, for example, permissions that are estimated to have greater than a threshold probability of being used, by the identity, in a future time period.

At operation 1812, a new policy is generated, based on a set of new policy constraints, that corresponds to a largest group of identities within the new policy identity pool for which the set of new policy constraints is satisfied. For example, as shown in FIG. 14A, a new policy 1411 is generated for identity group 1421, which is a largest group of identities within the new policy identity pool 1230 for which a set of new policy constraints is satisfied. The identity group 1421 includes identities 1202-1204. As described above with reference to FIG. 15, the set of new policy constraints (e.g., new policy constraints 1500) may include a first constraint (e.g., constraint 1501) that the new policy includes the respective selected permissions for each identity within the largest group of identities. The set of new policy constraints may also include a second constraint (e.g., constraint 1502) that the new policy does not exceed one or more maximum additional permission (AP) thresholds. In some examples, the one or more maximum additional permission thresholds may comprise a plurality of maximum additional permission thresholds, and each identity of the new policy identity pool may have a respective maximum additional permission threshold of the plurality of maximum additional permission thresholds. For example, as described above, one or more applicable maximum additional thresholds may be set by a customer, by the service, and/or by any other entities. As described above, the term additional permissions, as used herein, refers to permissions that are not included in the selected permissions 102 for an identity 1202-1207. An applicable maximum additional permission threshold is an upper limit on how many additional permissions may be granted by the new policy without violating the new policy constraints 1500. The one or more applicable maximum additional permission thresholds include one or more maximum additional permission thresholds that are applicable to the identities in the largest identity group. As described above, in some examples, all identities may have the same maximum additional permission threshold. In this scenario, there will only be one applicable maximum additional permission threshold that is used for all identities. By contrast, in some examples, each identity (or at least some of the identities) may have their own respective maximum additional permission thresholds, which may be different from one another. In this scenario, there may be a plurality of different applicable maximum additional permission thresholds.

The set of new policy constraints may also include a third constraint (e.g., constraint 1503) that the new policy does not exceed a maximum permission quantity threshold. In some examples, the maximum permission quantity threshold may be set by a customer, by the service, and/or by any other entities. The maximum permission quantity threshold is an upper limit on how many permissions the new policy may include without violating the new policy constraints 1500. The maximum permission quantity threshold may prevent the new policy from including too many permissions, which may make the new policy difficult and cumbersome for a customer to manage.

At operation 1814, one or more indications are provided, to a user, to attach the new policy to each identity within the largest group of identities. For example, an identity management service may provide an indication, such as a recommendation, to a user, to attach the new policy to each identity within the largest group of identities. In some examples, the indication may indicate the contents of the new policy and may indicate the identities within the largest identity group.

At operation 1816, the largest group of identities is removed from the new policy identity pool. For example, as shown in FIG. 14B, subsequent to generation of new policy 1411 for identities 1202-1204 (as described above with reference to FIG. 14A), identities 1202-1204 are removed from the new policy identity pool 1230. As shown in FIG. 14B, the removal of identities 1202-1204 leaves only identities 1205-1207 remaining in the new policy identity pool 1230.

At operation 1818, it is determined whether the new policy identity pool is empty. If the new policy identity pool is not yet empty, then, at operation 1820, the performance of operations 1812-1818 is repeated until the new policy identity pool is empty. An additional new policy is generated at each iteration of operations 1812-1818. For example, after removing identities 1202-1204 from the new policy identity pool 1230, policy generator 1410 then generates a new policy 1412 for the largest group of identities (which, in the example of FIG. 14B, is identity group 1422) remaining within the new policy identity pool 1230 for which a set of new policy constraints (e.g., new policy constraints 1500 of FIG. 15) are satisfied. As shown, in the example of FIG. 14B, policy generator 1410 generates new policy 1412 for identity group 1422, which includes identities 1205-1206. Additionally, in FIG. 14C, it is shown that, subsequent to generation of new policy 1412 for identities 1205-1206 (as described above with reference to FIG. 14B), identities 1205-1206 are removed from the new policy identity pool 1230. As shown in FIG. 14C, the removal of identities 1205-1206 leaves only identity 1207 remaining in the new policy identity pool 1230. As also shown in FIG. 14C, policy generator 1410 then generates a new policy 1413 for the largest group of identities (which, in the example of FIG. 14C, is identity group 1423) remaining within the new policy identity pool 1230 for which a set of new policy constraints (e.g., new policy constraints 1500 of FIG. 15) are satisfied. As shown, in the example of FIG. 14C, policy generator 1410 generates new policy 1413 for identity group 1423, which includes only identity 1207.

If, at operation 1818, it is determined that the new policy identity pool is empty, then, at operation 1822, the process of FIG. 17B is ended. For example, subsequent to generation of new policy 1413 for identity 1207, identity 1207 may be removed from the new policy identity pool 1230. Upon removal of identity 1207 from the new policy identity pool 1230, the new policy identity pool 1230 is emptied and the new policy generation process is completed. As described above, in some examples, in order to improve the speed of the new policy generation process, the identities within a new policy identity pool may be clustered into multiple clusters (e.g., sub-pools) based on the selected permissions of each identity, such that identities with similar selected permissions may be included in the same cluster as one another. Thus, in some examples, the new policy identity pool described in FIG. 17B may be an identity cluster of a plurality of identity clusters formed based on a selected permission-based clustering of a larger parent new policy identity pool.

Figure 18:
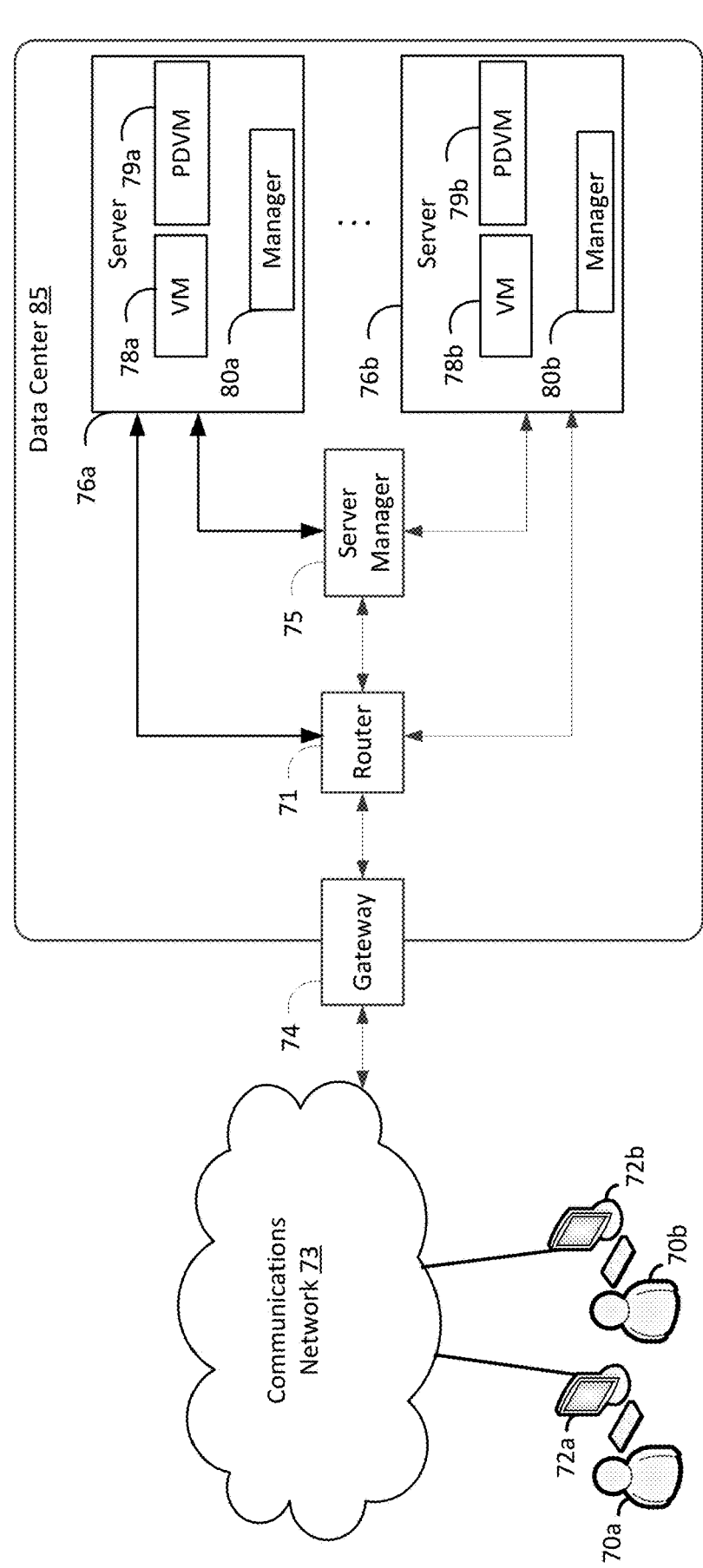
FIG. 18 is a diagram illustrating an example system for transmitting and providing data that may be used in accordance with the present disclosure.

An example system for transmitting and providing data will now be described in detail. In particular, FIG. 18 illustrates an example computing environment in which the embodiments described herein may be implemented. FIG. 18 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include policy determination virtual machines (PDVM's) 79*a-b*, which are virtual machines that are configured to execute any, or all, of the new and existing policy determination techniques for a set of identities as described herein.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 18, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 18 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 18, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 18, a server manager 75 is also employed to at least in part direct various communications to, from and/or between servers 76*a* and 76*b*. While FIG. 18 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 18 has been greatly simplified and that many more networks and networking devices may be utilized to interconnect the various computing systems disclosed herein. These network topologies and devices should be apparent to those skilled in the art.

It should also be appreciated that data center 85 described in FIG. 18 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 19:
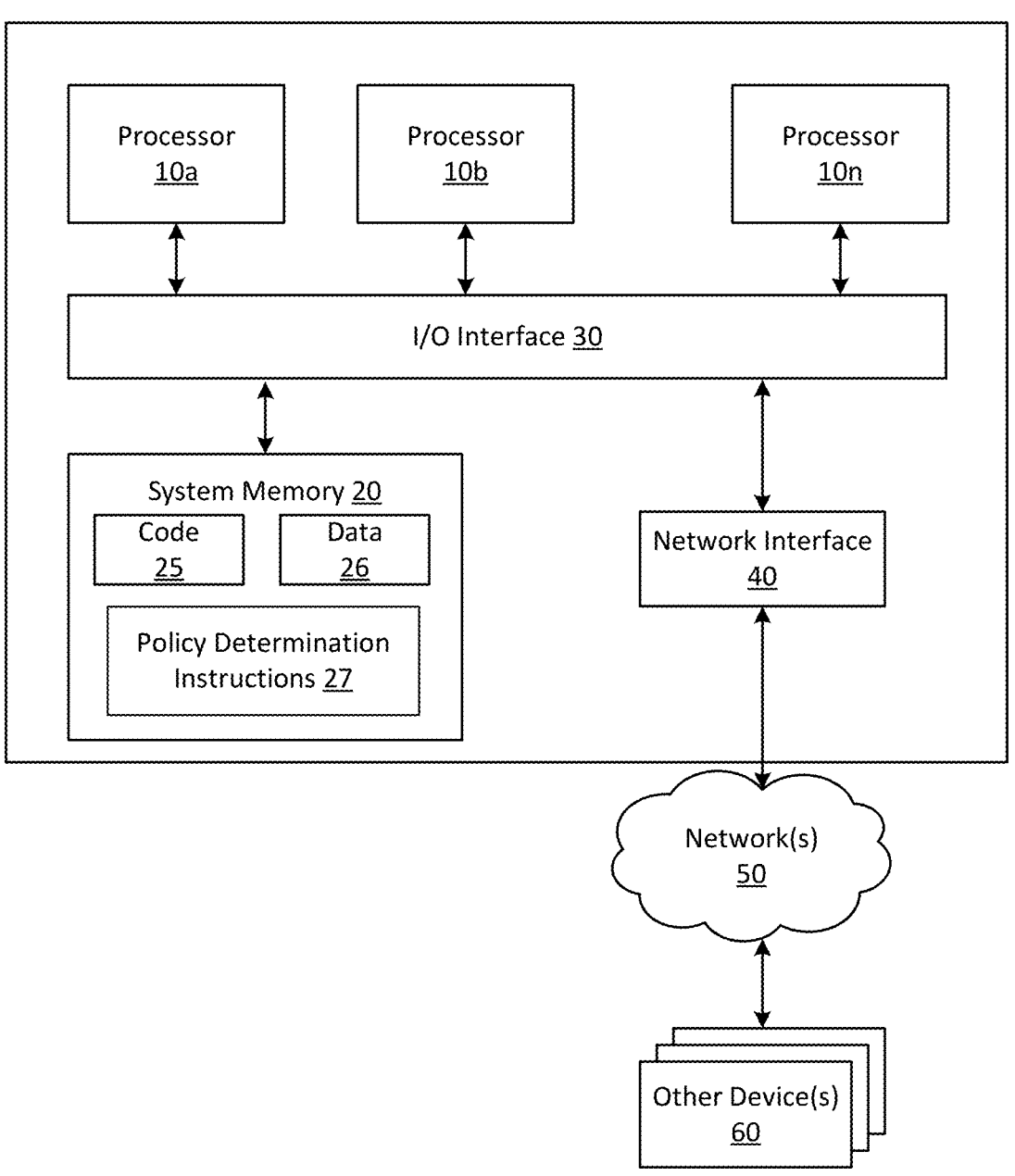
FIG. 19 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 19 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes policy determination instructions 27, which are instructions for executing any, or all, of the new and existing policy determination techniques for a set of identities as described herein.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the one or more processors to perform operations comprising:

adding a plurality of user sets to a user set pool associated with new policy generation, wherein each user set of the plurality of user sets has respective permissions associated with permission usage by the user set, wherein the respective permissions include one or more permissions that have been used by the user set within a prior time window;

generating, based on a set of new policy constraints, a new policy that corresponds to a largest group of user sets within the user set pool for which the set of new policy constraints is satisfied, wherein the set of new policy constraints includes a first constraint that the new policy includes the respective permissions for each user set within the largest group of user sets and a second constraint that the new policy does not exceed one or more additional permission thresholds;

providing, to a user, one or more indications to attach the new policy to each user set within the largest group of user sets;

removing the largest group of user sets from the user set pool; and repeating the generating, the providing, and the removing until the user set pool is empty.

2. The computing system of claim 1, wherein the operations further comprise:

determining, individually for each user set of the plurality of user sets, that there is no group of one or more existing policies that satisfies a set of existing policy constraints for the user set.

3. The computing system of claim 2, wherein each user set of the plurality of user sets is added to the user set pool based on there being no group of one or more existing policies that satisfies the set of existing policy constraints for the user set.

4. The computing system of claim 1, wherein the set of new policy constraints further includes a third constraint that the new policy does not exceed a permission quantity threshold.

5. A computer-implemented method comprising:

adding a plurality of user sets to a user set pool associated with new policy generation, wherein each user set of the plurality of user sets has respective permissions associated with permission usage by the user set, wherein the respective permissions include one or more permissions that have been used by the user set within a prior time window;

generating, based on a set of new policy constraints, a new policy that corresponds to a largest group of user sets within the user set pool for which the set of new policy constraints is satisfied, wherein the set of new policy constraints includes a first constraint that the new policy includes the respective permissions for each user set within the largest group of user sets and a second constraint that the new policy does not exceed one or more additional permission thresholds; and providing, to a user, one or more indications to attach the new policy to each user set within the largest group of user sets.

6. The computer-implemented method of claim 5, wherein the one or more additional permission thresholds comprise a plurality of additional permission thresholds, and wherein each user set of the user set pool has a respective additional permission threshold of the plurality of additional permission thresholds.

7. The computer-implemented method of claim 5, further comprising:

determining, individually for each user set of the plurality of user sets, that there is no group of one or more existing policies that satisfies a set of existing policy constraints for the user set.

8. The computer-implemented method of claim 7, wherein each user set of the plurality of user sets is added to the user set pool based on there being no group of one or more existing policies that satisfies the set of existing policy constraints for the user set.

9. The computer-implemented method of claim 5, further comprising:

removing the largest group of user sets from the user set pool; and repeating the generating, the providing, and the removing until the user set pool is empty.

10. The computer-implemented method of claim 5, wherein the set of new policy constraints further includes a third constraint that the new policy does not exceed a permission quantity threshold.

11. The computer-implemented method of claim 5, wherein the user set pool is a user set cluster of a plurality of user set clusters formed based on a permission-based clustering of a parent user set pool.

12. The computer-implemented method of claim 5, further comprising:

determining, for each user set of the plurality of user sets, the respective permissions.

13. The computer-implemented method of claim 5, wherein the respective permissions further include permissions that are estimated to have greater than a threshold probability of being used, by the user set, in a future time period.

14. One or more non-transitory computer-readable storage media having stored thereon computing instructions that, upon execution by one or more computing devices, cause the one or more computing devices to perform operations comprising:

adding a plurality of user sets to a user set pool associated with new policy generation, wherein each user set of the plurality of user sets has respective permissions associated with permission usage by the user set, wherein the respective permissions include one or more permissions that have been used by the user set within a prior time window;

generating, based on a set of new policy constraints, a new policy that corresponds to a largest group of user sets within the user set pool for which the set of new policy constraints is satisfied, wherein the set of new policy constraints includes a first constraint that the new policy includes the respective permissions for each user set within the largest group of user sets and a second constraint that the new policy does not exceed one or more additional permission thresholds; and providing, to a user, one or more indications to attach the new policy to each user set within the largest group of user sets.

15. The one or more non-transitory computer-readable storage media of claim 14, wherein the one or more additional permission thresholds comprise a plurality of additional permission thresholds, and wherein each user set of the user set pool has a respective additional permission threshold of the plurality of additional permission thresholds.

16. The one or more non-transitory computer-readable storage media of claim 14, wherein the operations further comprise:

determining, individually for each user set of the plurality of user sets, that there is no group of one or more existing policies that satisfies a set of existing policy constraints for the user set.

17. The one or more non-transitory computer-readable storage media of claim 16, wherein each user set of the plurality of user sets is added to the user set pool based on there being no group of one or more existing policies that satisfies the set of existing policy constraints for the user set.

18. The one or more non-transitory computer-readable storage media of claim 14, wherein the operations further comprise:

removing the largest group of user sets from the user set pool; and repeating the generating, the providing, and the removing until the user set pool is empty.

19. The one or more non-transitory computer-readable storage media of claim 14, wherein the set of new policy constraints further includes a third constraint that the new policy does not exceed a permission quantity threshold.

20. The one or more non-transitory computer-readable storage media of claim 14, wherein the respective permissions further include permissions that are estimated to have greater than a threshold probability of being used, by the user set, in a future time period.

\* \* \* \* \*